(12) United States Patent
Kim et al.

(10) Patent No.: US 8,514,807 B2
(45) Date of Patent: Aug. 20, 2013

(54) METHOD OF TRANSMITTING MESSAGES IN COMMUNICATION NETWORKS

(75) Inventors: Yong Ho Kim, Seoul (KR); Jin Lee, Seoul (KR); Ki Seon Ryu, Seoul (KR); Jeong Ki Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 488 days.

(21) Appl. No.: 12/162,978

(22) PCT Filed: Feb. 1, 2007

(86) PCT No.: PCT/KR2007/000555
§ 371 (c)(1),
(2), (4) Date: Jul. 31, 2008

(87) PCT Pub. No.: WO2007/089109
PCT Pub. Date: Aug. 9, 2007

(65) Prior Publication Data
US 2009/0046657 A1    Feb. 19, 2009

(30) Foreign Application Priority Data

| Feb. 1, 2006 | (KR) | 10-2006-0009879 |
| Feb. 13, 2006 | (KR) | 10-2006-0013902 |
| Mar. 2, 2006 | (KR) | 10-2006-0019776 |
| Jun. 26, 2006 | (KR) | 10-2006-0057638 |

(51) Int. Cl.
*H04W 4/00* (2009.01)
(52) U.S. Cl.
USPC .......................................... 370/331; 370/338
(58) Field of Classification Search
USPC ................................................ 370/331, 338
See application file for complete search history.

(56) References Cited

U.S. PATENT DOCUMENTS

| 5,793,752 A | 8/1998 | Clarke et al. |
| 6,799,038 B2 | 9/2004 | Gopikanth |

(Continued)

FOREIGN PATENT DOCUMENTS

| KR | 10-2001-0046577 | 6/2001 |
| KR | 10-2001-0078787 | 8/2001 |

(Continued)

OTHER PUBLICATIONS

Michael Hoghooghi et al., "IEEE 802.21—Media Independent Handover Optimal Beacon & Architecture for MIH", Freescale Semiconductor, Inc., Jan. 2005, XP-002587905.

(Continued)

*Primary Examiner* — Farah Faroul
(74) *Attorney, Agent, or Firm* — Lee, Hong, Degerman, Kang & Waimey

(57) ABSTRACT

A method of transmitting messages for acquisition of information related to a specific network entity or a link network during network selection in a mobile terminal is disclosed. The method of transmitting messages for acquisition of information related to a network entity or a link network during network selection in a mobile terminal comprises generating, in an upper management entity, a first primitive for requesting information related to the network entity or the link network through an access point (AP), delivering the first primitive to a media access control (MAC) layer, transmitting a first request message including contents of the first primitive to the access point to request the information, receiving a second response message from the access point, the second response message including information related to the specific network entity or the link network, and delivering a third primitive from the MAC layer to the upper management entity, the third primitive including contents of the second response message.

4 Claims, 21 Drawing Sheets

(56) References Cited

U.S. PATENT DOCUMENTS

| | | | |
|---|---|---|---|
| 7,496,364 B2* | 2/2009 | Hoghooghi et al. | 455/436 |
| 7,792,081 B2* | 9/2010 | Kim et al. | 370/331 |
| 2003/0169774 A1* | 9/2003 | Del Prado Pavon et al. | 370/503 |
| 2004/0064741 A1* | 4/2004 | Haverinen et al. | 713/202 |
| 2005/0249161 A1 | 11/2005 | Carlton | |
| 2006/0009246 A1* | 1/2006 | Marinier et al. | 455/502 |
| 2006/0014492 A1* | 1/2006 | Del Prado Pavon et al. | 455/41.2 |
| 2006/0029023 A1* | 2/2006 | Cervello et al. | 370/333 |
| 2006/0099948 A1* | 5/2006 | Hoghooghi et al. | 455/436 |
| 2006/0217147 A1* | 9/2006 | Olvera-Hernandez et al. | 455/552.1 |
| 2009/0122765 A1* | 5/2009 | Dimou et al. | 370/336 |
| 2009/0298504 A1* | 12/2009 | Lee et al. | 455/437 |

FOREIGN PATENT DOCUMENTS

| | | |
|---|---|---|
| KR | 10-0742468 | 7/2007 |
| WO | 2004/045081 | 5/2004 |
| WO | 2007080495 | 7/2007 |

OTHER PUBLICATIONS

Joint Harmonized Contribution, "Media Independent Handover", IEEE 802.21 Media Independent Handover Services, May 2005, XP-002488344.

IEEE, "Draft IEEE Standard for Local and Metropolitan Area Networks: Media Independent Handover Services", IEEE P802.21/D00.05, Jan. 2006, XP-017654174.

Information Sciences Institute University of Southern California, "Internet Protocol Darpa Internet Program Protocol Specification," XP015006773, Sep. 1981, 52 pages.

European Patent Office Application Serial No. 07708706.2, Office Action dated Jun. 10, 2013, 6 pages.

Joint Harmonized Contribution, "Media Independent Handover," IEEE 802.21 Media Independent Handover Services, May 2005, 42 pages.

Taiwan Intellectual Property Office Application Serial No. 096103787, Office Action dated May 28, 2013, 7 pages.

* cited by examiner

METHOD OF TRANSMITTING MESSAGES IN COMMUNICATION NETWORKS

CROSS-REFERENCE TO RELATED APPLICATIONS

This application is a national stage application of International Application No. PCT/KR2007/000555, filed on Feb. 1, 2007, which claims the benefit of earlier filing date and right of priority to Korean Application No. 10-2006-0009879, filed on Feb. 1, 2006, Korean Application No. 10-2006-0013902, filed on Feb. 13, 2006, Korean Application No. 10-2006-0019776, filed on Mar. 2, 2006, and Korean Application No. 10-2006-0057638, filed on Jun. 26, 2006.

TECHNICAL FIELD

The present invention relates to communication networks, and more particularly, to a method of transmitting messages in communication networks.

BACKGROUND ART

IEEE802.21 is in the International standardization stage for media independent handover (MIH) between heterogeneous networks, and is to provide seamless handover and service continuity between heterogeneous networks in order to improve a user's convenience for a mobile terminal. The IEEE802.21 defines basic requirements such as an MIH function, an event service (ES), a command service (CS), and an information service (IS).

The mobile terminal is a multimode node that supports one or more interface types, wherein the interface may be one of the following types: wire-line type such as 802.3 based Ethernet; IEEE802.XX based wireless interface such as IEEE802.11, 802.15, and 802.16; and interface prescribed by a cellular standardization organization such as 3GPP and 3GPP2.

FIG. 1 illustrates a protocol stack of a multimode mobile terminal. As shown in FIG. 1, a multimode mobile terminal has a media access control (MAC) layer and a physical layer (PHY) of each mode, and an MIH function is a logic entity and can freely be arranged while implementing interface through each layer and a service access point (SAP) within a protocol stack.

Media independent handover (MIH) should be defined between 802 based interfaces or between the 802 based interfaces and non-802 based interfaces 3GPP and 3GPP2 mentioned above. A mobility management protocol of an upper layer such as a mobile IP and a session initiation protocol (SIP) should be supported for handover and a seamless service.

Hereinafter, a related art handover between heterogeneous networks will be described.

The IEEE802.21 standard is to assist various handover methods to be easily operated, wherein the handover methods can be classified into "break before make" and "make before break." The media independent handover function (MIHF) provides an asymmetric service such as a media independent event service (MIES) and a symmetric service such as a media independent command service (MICS) to upper layers and lower layers through a service access point (SAP) which is well defined. The MIH technique includes three MIHF services and a media independent handover protocol. The three MIHF services include a media independent event service (MIES), a media independent command service (MICS), and a media independent information service (MIIS).

The media independent event service is information forwarded from a link layer to upper layers, wherein the upper layers can receive the information through a registration procedure. In this case, in order to assist handover by predicting handover, the upper layers including the mobility management protocol are required to receive link layer information as to that handover will occur soon or handover has been just implemented. The media independent event service can be classified into a link event terminating at the MIHF from an entity that has generated an event in lower layers (second layer and below) and an MIH event forwarded to upper layers (third layer and above) registered by the MIHF. The link event and the MIH event can be classified into two types depending on areas to which they are forwarded. If the events are generated from an event source within a local stack and forwarded from the event source to a local MIHF layer or from the MIHF layer to the upper layers, they are referred to as local events. If the events are generated from a remote event source and forwarded from the remote event source to a remote MIHF layer and then from the remote MIHF layer to the local MIHF layer, these events are referred to as remote events.

FIG. 2 illustrates a structure of a local event model and an MIH event model. The MIH events are forwarded from an MIH layer to a higher management entity or an upper layer, and correspond to event triggers of the related art. The link event is forwarded from the lower layer (MAC or physical layer) to the MIH layer, and primitives are used as the link event, wherein the primitives are used in each interface MAC layer or physical layer.

FIG. 3 illustrates a structure of a remote link event model according to the present invention. If an event is generated from a lower layer within a local stack to the MIH layer within the same local stack, the MIH layer forwards the generated event to the MIH layer of a remote stack. Also, the event may be generated from the lower layer within the remote stack to the MIH layer of the remote stack, whereby the MIH layer of the local stack may receive a trigger.

FIG. 4 illustrates a structure of a remote MIH event model according to the present invention. Referring to FIG. 4, the MIH layer within the local stack generates a remote MIH event and forwards the generated remote MIH event to the other MIH layer within the remote stack. The other MIH layer forwards the remote MIH event to an upper management entity or an upper layer within its stack. Also, the event may be generated from the MIH layer within the remote stack to the MIH layer within the local stack, whereby the upper layer of the local stack may receive a trigger.

The media independent command service corresponds to commands sent from the upper layers (third layer and above) to the lower layers (second layer and below) to allow the upper layers and other MIH users to determine the link status and adjust an optimized operation of a multimode device. Similarly to the media independent event services, the media independent command service is classified into a link command and an MIH command. The link command and the MIH command are classified into a local command and a remote command depending on areas to which they are forwarded. A local MIH command is generated from the upper layers and then forwarded to the MIHF layer (for example, from the mobility management protocol of the upper layer to the MIHF layer or from a policy engine to the MIHF layer). Local link command languages are generated from the MIHF layer to adjust lower layer entities and then forwarded to the lower layers (for example, from the MIHF layer to the media access control layer or from the MIHF layer to the physical layer). A remote MIH command is generated from the upper layers and forwarded to a remote peer stack, and a remote link command is generated from the MIHF layer and forwarded to the lower layers of the remote peer stack.

FIG. 5 illustrates a structure of an MIH command model and a link command model. The MIH command is generated from the upper management entity or the upper layer and then forwarded to the MIH layer, and is to command the MIH layer to take some action. The link command is generated from the MIH layer and then forwarded to the lower layer, and is to command the lower layer to take some action.

FIG. 6 illustrates a structure of a remote MIH command model. The remote MIH command is generated from the upper management entity or the upper layer within the local stack and then forwarded to the MIH layer. The MIH layer forwards the remote MIH command to the other MIH layer within the remote stack. Also, a command may be generated from the upper layer within the remote stack to the MIH layer of the remote stack, whereby the MIH layer of the local stack may receive the command.

FIG. 7 illustrates a structure of a remote link command model. The MIH layer within the local stack generates the remote link command and forwards the generated remote link command to the other MIH layer within the remote stack. The other MIH layer forwards the remote link command to the lower layer within the remote stack. Also, the command may be generated from the MIH layer within the remote stack to the MIH layer within the local stack, whereby the lower layer of the local stack may receive the command.

The media independent information service is for homogeneous or heterogeneous networks within a geographical area. The MIHF layer of the networks as well as the MIHF layer of the mobile terminal can detect and acquire the media independent information service. The media independent information service includes various kinds of information elements required to determine intelligent handover.

The MIH protocol is classified into three stages, i.e., an MIH capability discovery stage, an MIH remote registration stage, and an MIH message exchange stage. The MIH capability discovery stage can be performed by two methods such as a method of broadcasting MIH capability in a network and a method of acquiring MIH capability at the request of a mobile terminal.

Hereinafter, a wireless LAN (IEEE802.11) network structure will be described.

The wireless LAN means a network environment that provides LAN services to a wireless terminal provided with a wireless LAN card, such as PDA and notebook PC, by using an access point (AP) device corresponding to a hub of a wire LAN. In other words, the wireless LAN may be regarded as a system obtained by replacing a wire section between a hub and a user equipment with a wireless section between an AP and a network interface card (NIC) such as a wireless LAN card. Since the wireless LAN does not require a line of a mobile terminal, it has advantages in that it is easy to rearrange the mobile terminal and to construct and extend networks, and enables communication during motion. On the other hand, the wireless LAN has disadvantages in that transmission speed is relatively lower than that of the wire LAN, signal quality is unstable in view of properties of a wireless channel, and signal interference may occur.

FIG. 8 illustrates an example of a network of a wireless LAN. As shown in FIG. 8, the network of the wireless LAN is classified into two types depending on whether the network includes AP. The network of the wireless LAN, which includes AP, is referred to as an infrastructure network while the network of the wireless LAN, which does not include AP, is referred to as an ad-hoc network. A service area provided by one AP is referred to as a basic service area (BSA), and a mobile terminal which includes AP and is connected with the AP is referred to as a basic service set (BSS). A service provided to the mobile terminal connected with the AP is referred to as a station service (SS). The SS includes a service exchanged between mobile terminals in an ad-hoc network.

FIG. 9 illustrates an example of a wireless LAN structure which includes a distribution system (DS) and an extended service set (ESS). The BSS constitutes an extended service set (ESS) which includes several BSSs BSS1 and BSS2. An AP structure which connects the BSSs is referred to as a distribution system (DS). The DS may be provided by various kinds of techniques (for example, wireless LAN and wire LAN). A service provided through the DS is referred to as a distribution system service (DSS), and the AP is operated by a station STA and at the same time provides the DSS to the STA so that the STA accesses the DS. Communication between the BSS and the DS is performed through the AP which is one of elements of the BSS.

A remote request broker (RRB) which is one of elements of the AP of the wireless LAN exists in a system management entity (SME) and enables communication between APs which exist in a mobility domain. In other words, communication through the DS is supported between the APs which own equal mobility domain ID by a logical connection structure through the DS. The RRB generates a remote request/response frame between a current AP and a next candidate AP or relays messages between them.

The wireless LAN (IEEE 802.11) according to the related art has considered a procedure for the AP and the mobile terminal to which MIHF is applied for media independent handover. Also, in the case that the AP which is currently of service to the mobile terminal does not support MIHF, the mobile terminal of the wireless LAN cannot be supported by media independent handover. Moreover, even in the case that the AP supports MIHF, the MIHF of the AP and the mobile terminal remotely transmit and receive MIH messages as general data. For this reason, a problem occurs in that latency is caused.

DISCLOSURE OF THE INVENTION

Accordingly, the present invention is directed to a method of transmitting messages in communication networks, which substantially obviates one or more problems due to limitations and disadvantages of the related art.

An object of the present invention is to provide a method of transmitting messages in communication networks, in which quality of service (QoS) can be ensured between a mobile terminal and an access point (AP).

Another object of the present invention is to provide a method of transmitting messages in communication networks, in which an entity supported by a media independent handover function (MIHF) within a distribution system can communicate with a mobile terminal.

Still another object of the present invention is to provide a method of transmitting messages in communication networks, in which radio resources can be prevented from being wasted, power consumption of a mobile terminal can be reduced, and it is proper to extend a wireless LAN network.

Further still another object of the present invention is to provide a method of transmitting messages in communication networks, in which information related to either a network entity in a homogeneous or heterogeneous network or information related to a link network linked with a network which includes an access point can be acquired through the access point.

In one aspect of the present invention, a method of transmitting messages for acquisition of information related to a network entity or a link network during network selection in a mobile terminal comprises generating, in an upper management entity, a first primitive for requesting information related to the network entity or the link network through an access point (AP), delivering the first primitive to a media access control (MAC) layer, transmitting a first request message including contents of the first primitive to the access point, receiving a first response message from the access point in response to the first request message, delivering a second primitive from the MAC layer to the upper management entity, the second primitive including contents of the first response message, receiving a second response message from the access point, the second response message including the information related to the network entity or the link network, and delivering a third primitive from the MAC layer to the upper management entity, the third primitive including contents of the second response message.

The first primitive includes identification information for identifying a type of information which is requested, and further includes a media independent handover (MIH) frame or vendor specific frame according to the identification information. Preferably, the MIH frame is either an MIH information service (IS) frame or an MIH capability discovery frame for capability discovery of event service and/or command service.

The first response message and the second primitive include at least one of status code, query ID, multicast address, and MIH capability. Preferably, the upper management entity is either a system management entity (SME) or an MIH entity.

The second response message includes an action frame containing query response message. Preferably, the second response message is received repeatedly several times. Preferably, the specific network entity is an MIHF entity. The second response message is broadcast or multicast by the specific access point. The first response message includes a multicast address if the second response message is multicast.

In another aspect of the present invention, a method of transmitting messages for acquisition of information related to a network entity or a link network during network selection in a mobile terminal comprises generating, in an upper management entity, a first primitive for requesting information related to the network entity or the link network through an access point (AP), delivering the first primitive to a media access control (MAC) layer, transmitting a first request message including contents of the first primitive to the access point to request the information, receiving a second response message from the access point, the second response message including information related to the specific network entity or the link network, and delivering a third primitive from the MAC layer to the upper management entity, the third primitive including contents of the second response message.

Preferably, the first primitive includes identification information for identifying a format of information which is requested, and request information according to the format indicated by the identification information. The request information included in the first primitive is an information frame. Preferably, the information frame is either an MIH frame or a vendor specific frame. Preferably, the MIH frame is either an MIH information service (IS) frame or an MIH capability discovery frame for capability discovery of event service and/or command service. The first response message and the second primitive include at least one of status code, query ID, multicast address, and MIH capability.

BEST MODE FOR CARRYING OUT THE INVENTION

Figure 1:
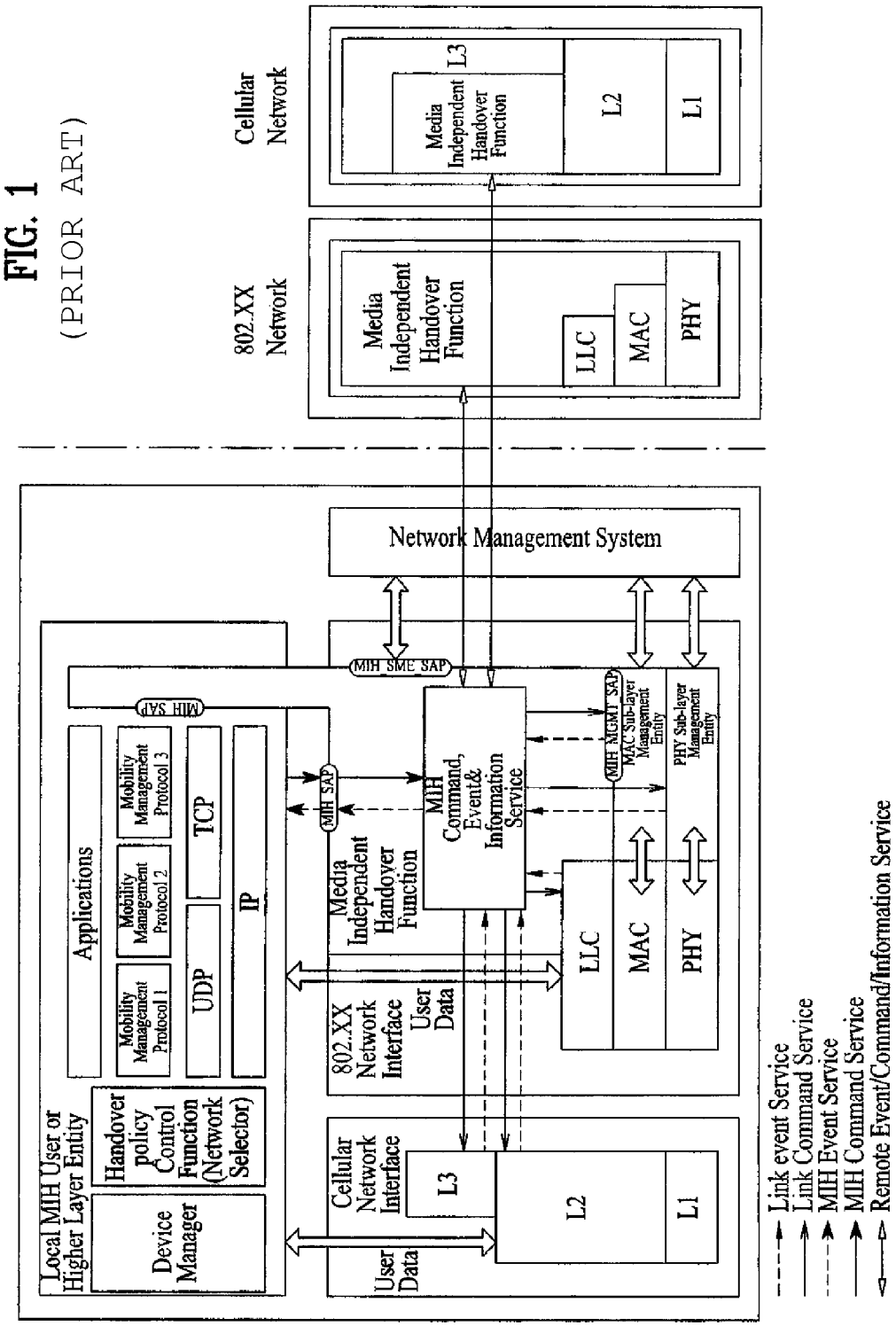
FIG. 1 illustrates a protocol stack of a multimode mobile terminal.
Figure 2:
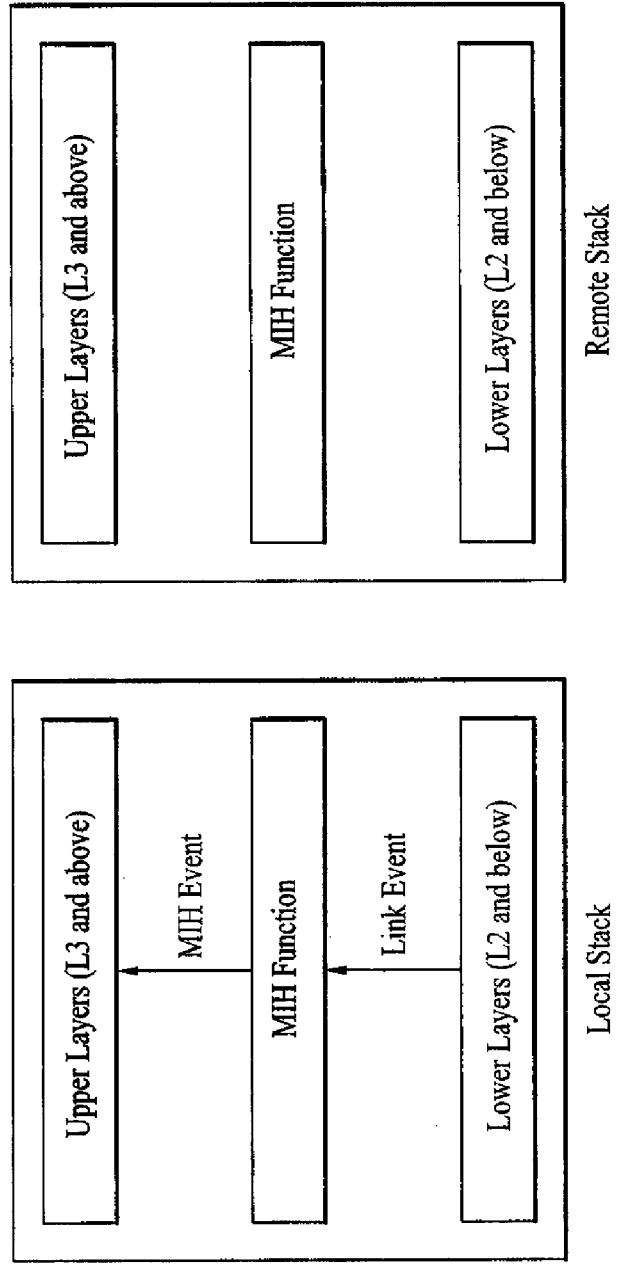
FIG. 2 illustrates a structure of a local event model and an MIH event model.
Figure 3:
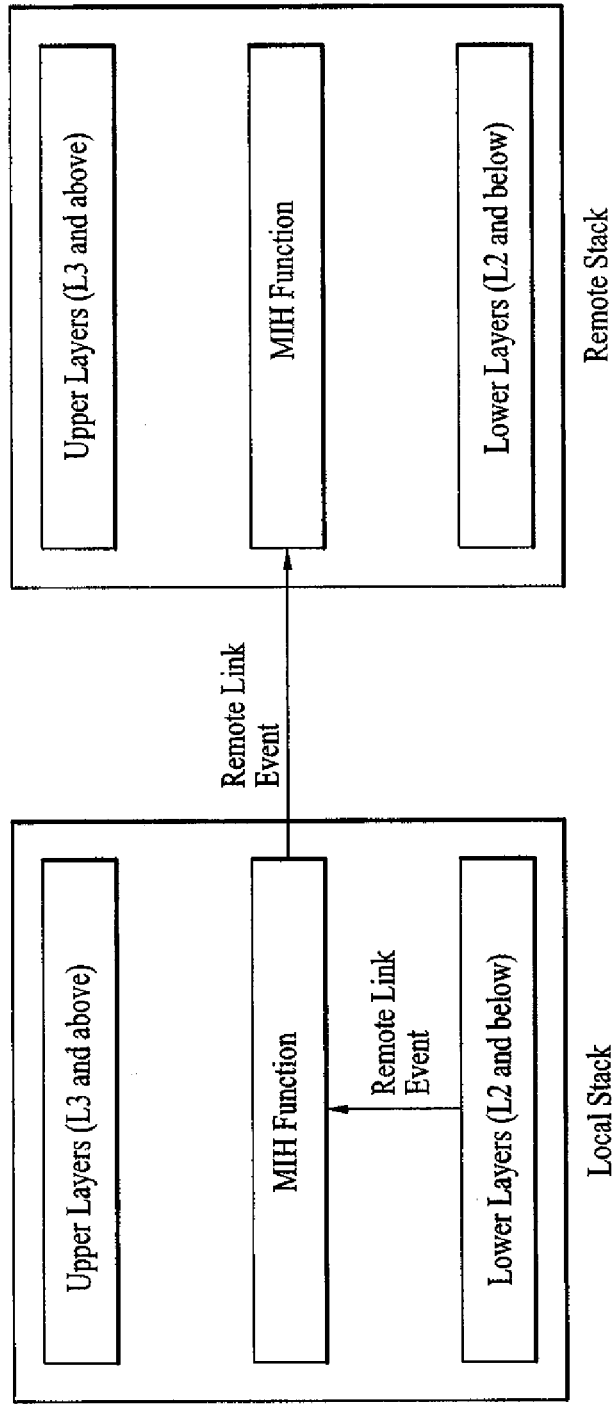
FIG. 3 illustrates a structure of a remote link event model.
Figure 4:
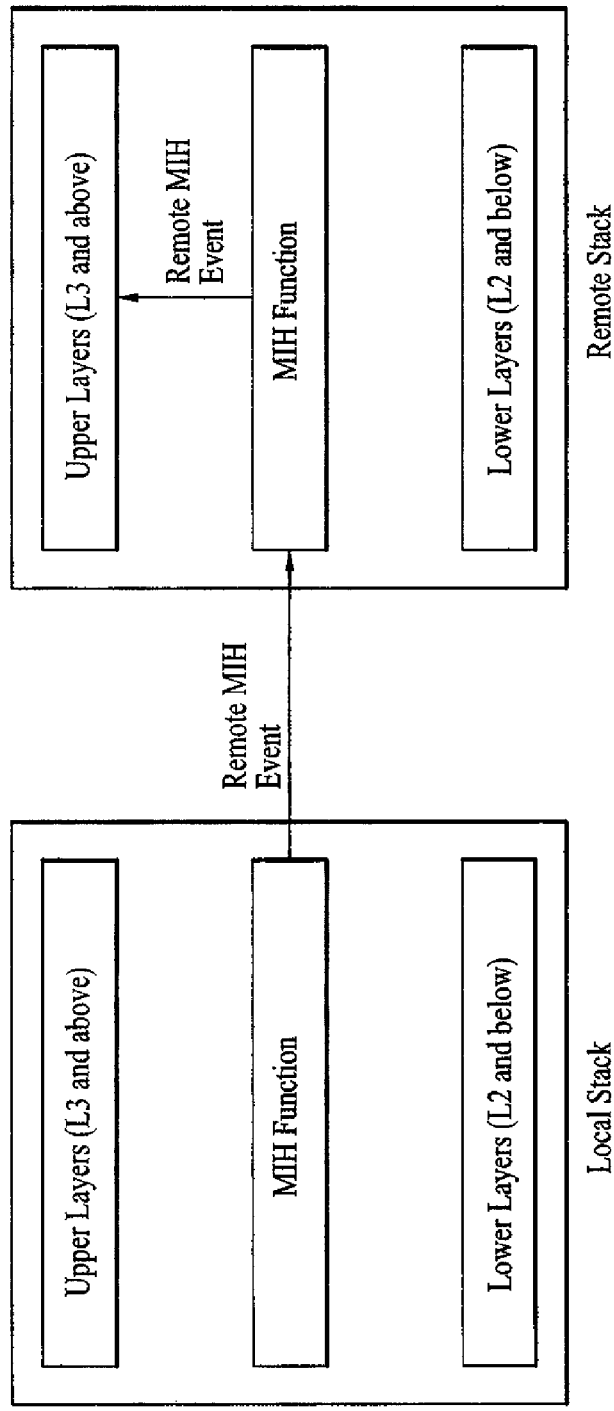
FIG. 4 illustrates a structure of a remote MIH event model.
Figure 5:
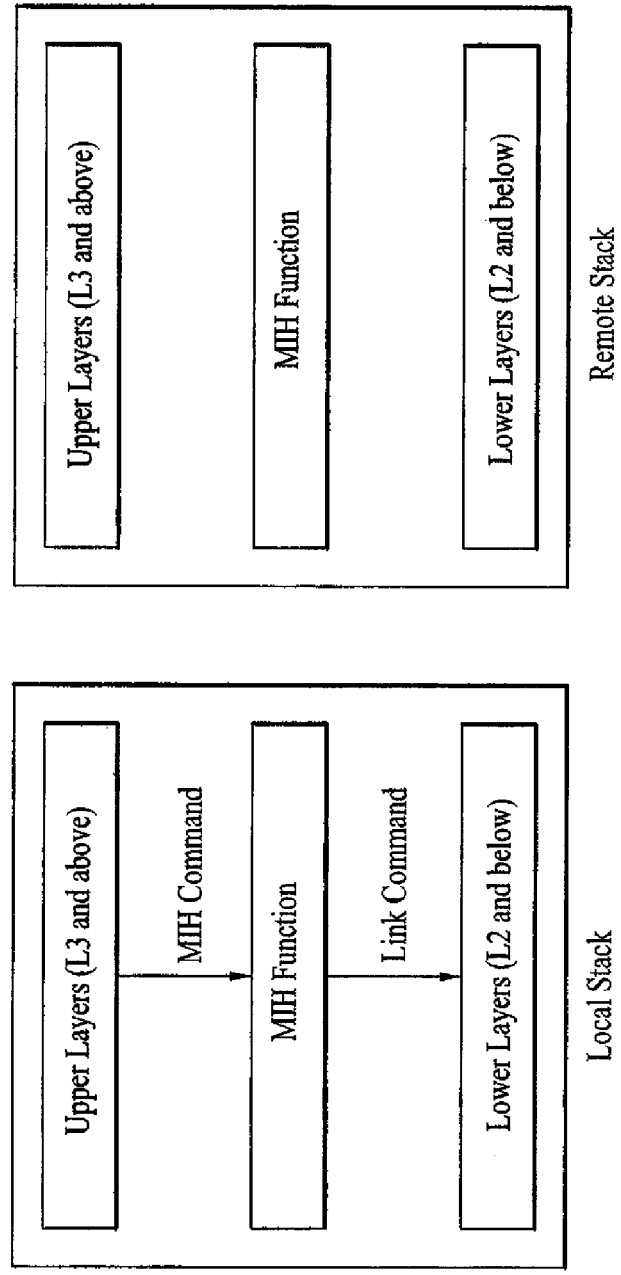
FIG. 5 illustrates a structure of an MIH command model and a link command model.
Figure 6:
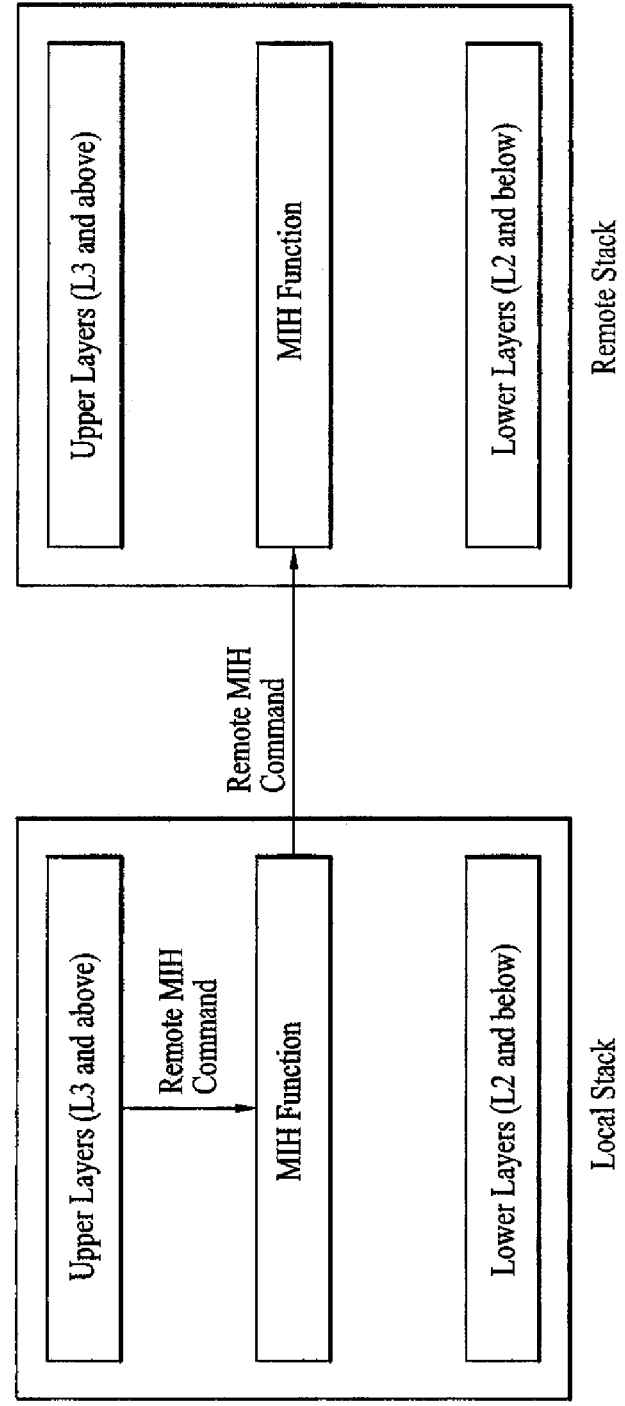
FIG. 6 illustrates a structure of a remote MIH command model.
Figure 7:
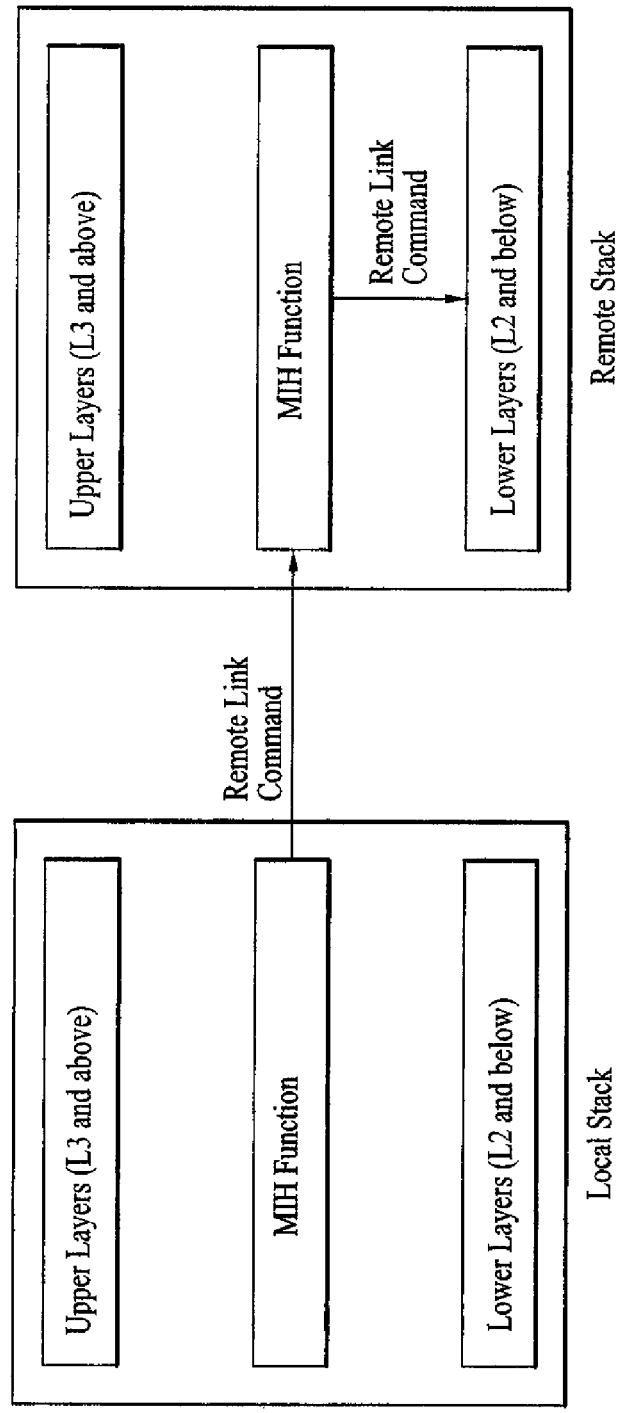
FIG. 7 illustrates a structure of a remote link command model.
Figure 8:
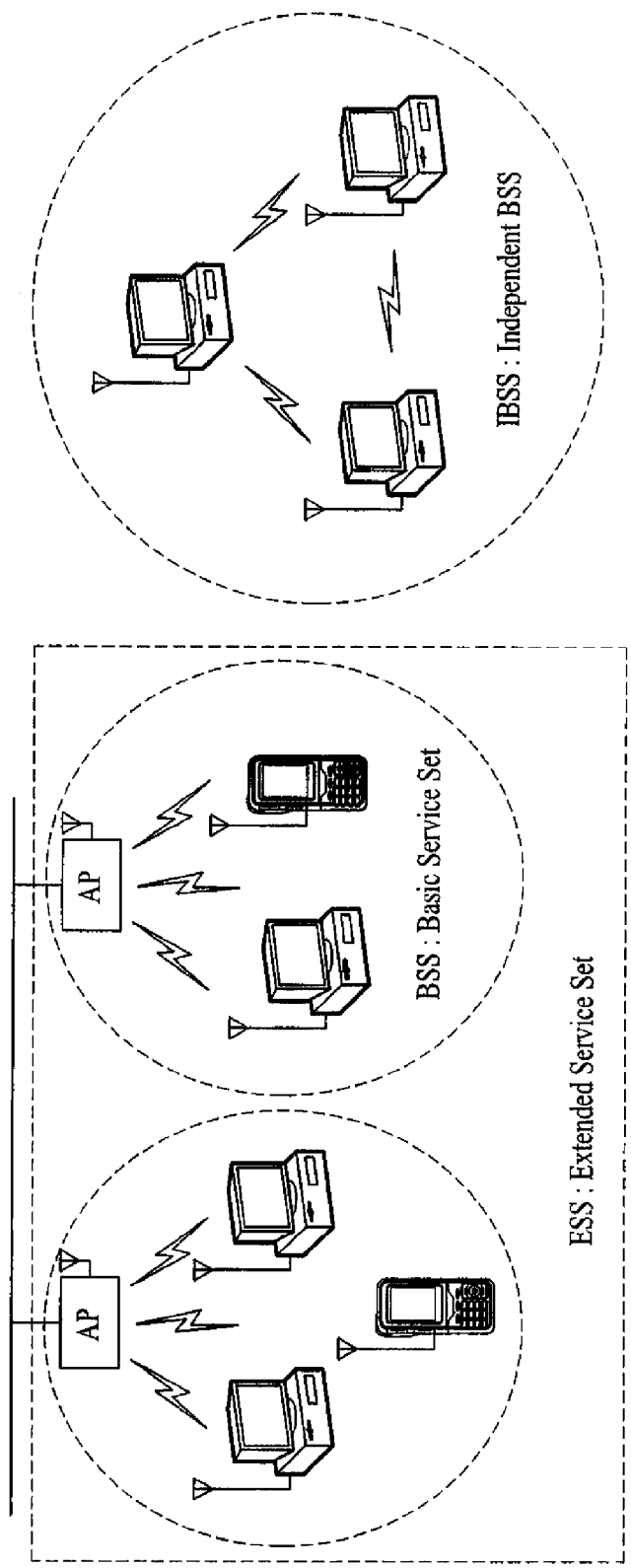
FIG. 8 illustrates an example of a network structure of a wireless LAN.
Figure 9:
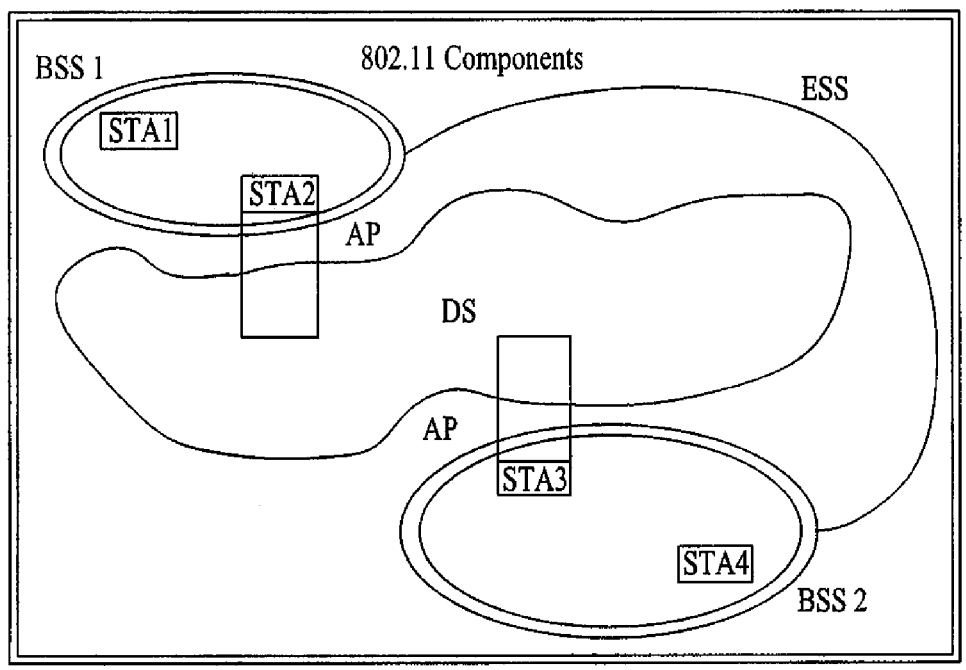
FIG. 9 illustrates an example of a wireless LAN structure which includes a DS and an ESS.

Hereinafter, reference will now be made in detail to the preferred embodiments of the present invention, examples of which are illustrated in the accompanying drawings.

An MIH capability discovery procedure should be performed at the stage of network discovery, wherein the MIH capability discovery procedure is to allow MIHF entities to discover as to whether their counter MIHF entities exist and which services are supported, thereby supporting a media independent handover function (MIHF) in a wireless LAN.

To perform the MIH capability discovery procedure, a mobile terminal of a wireless LAN receives information as to whether an entity which supports MIHF exists within a current AP or a DS equal to the current AP and information of an additional MIHF entity through a beacon.

In the case that MIH capability information is not acquired through the beacon or in the case that it is noted through the beacon that an MIHF entity does not exist in the current AP but exists within a DS equal to the current AP, it is possible to acquire capability information by request. Also, even in the case that it is noted through the beacon that the MIHF entity exists in the current AP, it is possible to acquire event and command list information which is supported by the AP through exchange of probe request/response messages.

In the case that capability information is acquired by request, the mobile terminal can transmit a probe request/response message along with information elements proposed by the present invention before an authentication procedure, so as to acquire capability information. The capability information may be acquired through exchange between new MIH protocol related action frames proposed by the present invention.

In the case that an MAC layer receives service identifiers from an MIHF entity through primitives, an action field mapped with each service identifier may be included in an MIH protocol action frame.

In the case that information is acquired by the probe request/response message, the current AP encapsulates an MIH capability discovery request IE included in the probe request message in a remote request message and relays the encapsulated MIH capability discovery request IE to an entity which supports MIHF within a DS. In the case that the current AP supports MIHF, the MIH capability discovery request IE is forwarded to an MIHF entity of the current AP. When the entity which supports MIHF within the DS responds to the mobile terminal, MIH capability discovery response IE is encapsulated in the remote response message and then forwarded to the current AP. The current AP forwards the MIH capability discovery response IE along with the probe response message. In the case that the current AP supports MIHF, the current AP directly forwards the MIH capability discovery response IE by encapsulating the MIH capability discovery response IE in the probe response message.

The wireless LAN network can classify an authentication procedure into three stages, i.e., 'before attachment' (state 1), 'before authentication' (state 2), and 'after authentication' (state 3) depending on authentication stages of the mobile terminal. The AP identifies a value of an "Action" field of an action frame transmitted from the mobile terminal, and determines whether to process the action frame transmitted depending on each stage.

Table 1 and Table 2 respectively illustrate examples of data formats of a probe request message and a probe response message, which are corrected in accordance with the present invention.

TABLE 1

| Order | Information | Notes |
|---|---|---|
| 1 | SSID | |
| 2 | Supported rates | |
| 3 | MIH Capability Discovery Request IE | Include information of event service and command service, which can be supported by STA. |

TABLE 2

| Order | Information | Notes |
|---|---|---|
| 1 | Timestamp | |
| 2 | Beacon interval | |
| 3 | Capability information | |
| 4 | SSID | |
| 5 | Supported rates | |
| 6 | FH Parameter Set | |
| 7 | DS Parameter Set | |
| 8 | CF Parameter Set | |
| 9 | IBSS Parameter Set | |

TABLE 2-continued

| Order | Information | Notes |
|---|---|---|
| 10 | MIH Capability Discovery Response IE | Include information of event service and command service, which can be supported by MIHF entity. |
| 11 | MIHF Entity Information IE | Notify there exists an entity which supports MIHF within DS equivalent to AP which currently forwards beacon, and include information for link to entity. |

Network discovery beacon information additionally provided in accordance with the present invention can be transmitted from the AP by the probe request of the mobile terminal unless the information is inserted to a beacon.

To support MIHF in the wireless LAN, category values for the MIH protocol action frame, MIH information elements, action fields, and status code fields are newly defined and their examples are as shown in Table 3, Table 4, Table 5, and Table 6 below.

TABLE 3

| Name | Value | See-sub field |
|---|---|---|
| Fast BSS Transition | 6 | 7.4.6 |
| MIH Protocol | 7 | |
| Reserved | 8-127 | |

TABLE 4

| Action field value | Description |
|---|---|
| 0 | Reserved |
| 1 | MIH Capability Discover Request |
| 2 | MIH Capability Discover Response |
| 3 | MIH Command Service Request |
| 4 | MIH Command Service Response |
| 5 | MIH Event Service Indication |
| 6 | MIH Protocol-I |
| 7 | MIH Protocol-II |
| 8 | MIH Protocol-III |
| 9-255 | Reserved |

TABLE 5

| Status code | Meaning |
|---|---|
| 0 | successful |
| 1 | Unspecified Failure |
| ... | ... |
| 54 | Invalid PMKID |
| 55 | Invalid EAPKIE |
| 56 | Invalid MIH Protocol Action Frame |
| 57-65535 | Reserved |

In the present invention, MIHF entity information is added to the existing beacon, wherein the MIHF entity information notifies that there exists an entity which supports MIHF within a DS equivalent to the current AP and also notifies address information of the entity. The entity which supports MIHF within the DS equivalent to the current AP could be either the AP which supports MIHF within the DS or a server which supports separate MIHF.

TABLE 6

| Order | Information | Notes |
|---|---|---|
| 1 | Timestamp | |
| 2 | Beacon interval | |
| 3 | Capability information | |
| 4 | SSID | |
| 5 | Supported rates | |
| 6 | FH Parameter Set | |
| 7 | DS Parameter Set | |
| 8 | CF Parameter Set | |
| 9 | IBSS Parameter Set | |
| 10 | TIM | |
| 31 | MIHF Entity Information | Notify that there exists an entity which supports MIHF within DS equivalent to AP which currently forwards beacon, and include information for link to entity. |

FIGS. 10, 11, 12, 13 and 14 illustrate examples of formats of an MIH capability discovery request action frame, an MIH capability discovery response action frame, an MIH command service request action frame, an MIH command service response action frame, and an MIH event service indication action frame, which are newly proposed in accordance with the present invention.

The MIH capability discovery request action frame is an action frame forwarded from the mobile terminal to acquire MIH capability information through the current AP. The current AP relays (forwards) the action frame to forward the action frame to the MIHF entity which supports MIHF existing within the equivalent DS during reception of the MIH capability discovery request action frame or encapsulates the MIH capability information in the remote request/response message to transmit the encapsulated MIH capability information, whereby the MIHF entity can receive the MIH capability discovery request message transmitted from the mobile terminal of the wireless LAN. In the case that the current AP is an entity which supports MIHF within the DS, the action frame is not relayed to the DS but forwarded to the MIHF entity of the current AP.

"MIH capability discovery request IE" includes information of event service or command service, which is supported by the mobile terminal.

The MIH capability discovery request action frame may be transmitted to allow the entity which can support MIHF within the DS to acquire MIH capability information of the mobile terminal.

Figure 10:
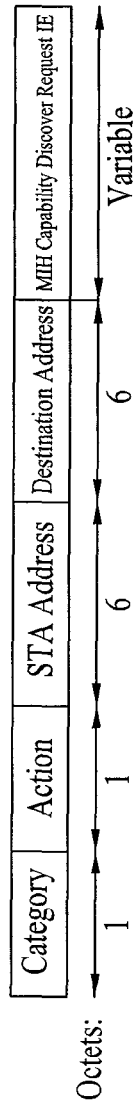
FIG. 10 to FIG. 14 illustrate examples of formats of an MIH capability discovery request action frame, an MIH capability discovery response action frame, an MIH command service request action frame, an MIH command service response action frame, and an MIH event service indication action frame, which are newly proposed in accordance with the present invention.

Each parameter of the MIH capability discovery request action frame shown in FIG. 10 will be described below.

Category: is a category value for the MIH protocol action frame and is set to 7 (MIH protocol).
Action: is set to 1 for MIH capability discovery request.
STA address: MAC address of mobile terminal
Destination address: is a MAC address of an entity which can support MIHF, and this address is specified if the mobile terminal knows an address of the entity which can support MIHF while a broadcast address or multicast address is specified if not so.
MIH capability discover request IE: includes information of event service and command service which can be supported by STA.

The MIH capability discovery response action frame is transmitted from the current AP to the mobile terminal in response to the MIH capability discovery request action frame. "MIH capability discovery response IE" includes information of event service or command service, which is supported by the MIHF entity.

Figure 11:
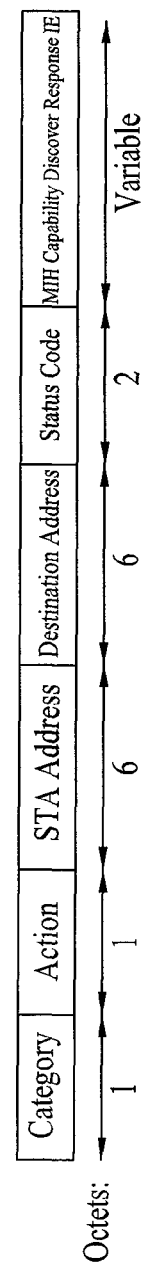

Each parameter of the MIH capability discovery response action frame shown in FIG. 11 will be described below.

Category: is a category value for the MIH protocol action frame and is set to 7 (MIH protocol).
Action: is set to 2 for MIH capability discovery response.
STA address: MAC address of mobile terminal.
Destination address: MAC address of an entity which can support MIHF.
Status code: indicates success/failure of the MIH protocol action request frame.
MIH capability discovery response IE: includes information of event service and command service which can be supported by the MIHF entity.

The MIH capability discovery request action frame is an action frame transmitted from the mobile terminal to remotely transmit a command service request message. If the MIH command service request action frame is received, the current AP relays (forwards) the action frame to forward the MIH command service request action frame to the MIHF entity which supports MIHF within the equivalent DS, or encapsulates the information in the remote request/response message to transmit the encapsulated information, whereby the MIHF entity can receive the MIH capability request message transmitted from the mobile terminal of the wireless LAN. In the case that the current AP is an entity which supports MIHF within the DS, the action frame is not relayed to the DS but forwarded to the MIHF entity of the current AP.

The MIH command service request action frame may be transmitted even when the MIHF in the DS remotely requests the MIHF of the mobile terminal of a command service. In this case, the MIH command service request action frame may be encapsulated in the remote request frame and then transmitted, or the MIH command service request action frame may be transmitted to the AP connected with the mobile terminal so that the AP may relay the action frame to the STA address.

Figure 12:
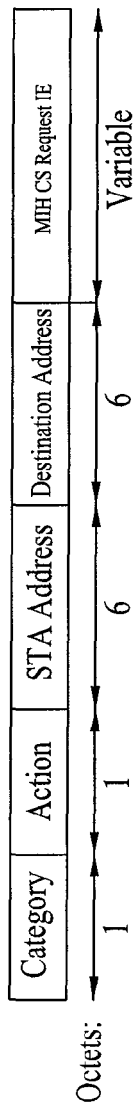

Each parameter of the MIH command service request action frame shown in FIG. 12 will be described below.

Category: is a category value for the MIH protocol action frame and is set to 7 (MIH protocol).
Action: is set to 3 for MIH command service request.
STA address: MAC address of mobile terminal.
Destination address: is a MAC address of an entity which can support MIHF, and this address is specified if the mobile terminal knows an address of the entity which can support MIHF while a broadcast address or multicast address is specified if not so.
MIH command service (CS) request IE: includes command service request information.

The MIH command service response action frame is transmitted from the current AP to the mobile terminal in response to the MIH command service request action frame. "MIH CS response IE" includes response information of the MIHF entity of the command service request.

The mobile terminal of the wireless LAN may transmit the MIH command service response action frame if the MIH command service response action frame is transmitted in response to the MIH command service request action frame requested by the MIHF entity within the DS.

Figure 13:
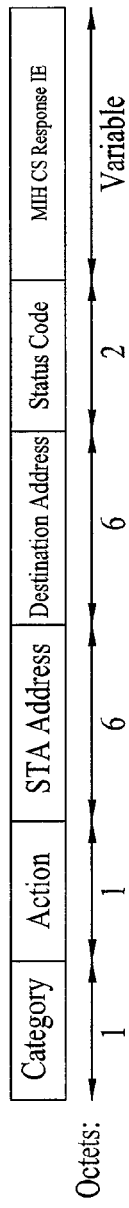

Each parameter of the MIH command service response action frame shown in FIG. 13 will be described below.

Category: is a category value for the MIH protocol action frame and is set to 7 (MIH protocol).
Action: is set to 4 for MIH command service response.
STA address: MAC address of mobile terminal.
Destination address: MAC address of an entity which can support MIHF.

Status code: indicates success/failure of the MIH protocol action request frame.

MIH command service (CS) response IE: includes response information of the MIH command service request.

The MIH event service indication action frame is used when the mobile terminal transmits event service to the entity which can support MIHF within the DS. Alternatively, the MIH event service indication action frame is used even when the entity which can support MIHF within the DS transmits event service information of the entity which can support MIHF to the mobile terminal. In the case that the mobile terminal transmits the event service, the current AP relays the action frame or transmits the action frame by encapsulating the action frame in the remote request message if the current AP is not an entity which can support MIHF. The remote request message is transmitted to the MIHF entity of the current AP if the current AP is an entity which can support MIHF. In the case that the entity which can support MIHF within the DS transmits the event service information, the message is transmitted by being encapsulated in the remote request or response message, or the request or response message is directly transmitted to the AP connected with the mobile terminal so that the corresponding AP transmits the action frame to the mobile terminal. In the case the AP is currently connected with the mobile terminal is an entity which supports MIHF, the MIH event service indication action frame is directly transmitted to the mobile terminal. "MIH ES indication IE" includes event service to be transmitted.

Figure 14:
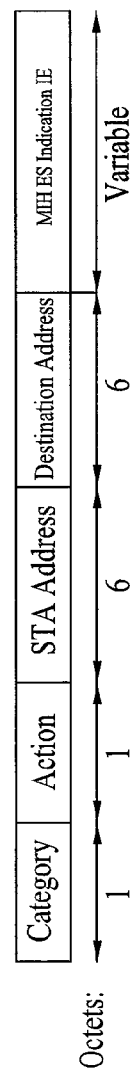

Each parameter shown in FIG. 14 will be described below.
Category: is a category value for the MIH protocol action frame and is set to 7 (MIH protocol).
Action: is set to 5 for MIH event service indication.
STA address: MAC address of mobile terminal.
Destination address: MAC address of an entity which can support MIHF.
MIH event service (ES) indication IE: includes event service information to be transmitted.

In the embodiment of the present invention, it has been described that examples of the "action" parameters include MIH capability discovery request, MIH capability discovery response, MIH command service request, MIH command service response, and MIH event service indication. However, these examples of the "action" parameters are only exemplary. The AP determines how to process the action frame depending on the status types of the mobile terminal at the time when the mobile terminal transmits the current action frame depending on values of the "action" parameters, wherein the status types of the mobile terminal include 'before attachment' (state 1), 'before authentication' (state 2), and 'after authentication' (state 3). For example, the AP may process the action frame only set as a specific action value in state 1 and also may discard the other action frames depending on the status types.

For another example, the "action" parameters may have values such as MIH protocol-I, MIH protocol-II, and MIH protocol-Ill. In the case the "action" parameter is MIH protocol-I, the action frame can be processed in state 1. In the case the "action" parameter is MIH protocol-II, the action frame can be processed in state 2. In the case the "action" parameter is MIH protocol-III, the action frame can be processed in state 3. In the case the action frame set at MIH protocol-I has been transmitted in state 2 and state 3, the AP can process the action frame. Similarly, the AP can process the action frame even in case that the action frame set at MIH protocol-I has been transmitted in state 3. However, the AP cannot process the action frame in the case that the action frame set at MIH protocol-I has been transmitted in state 1.

For another additional example, in the case that a service identifier (service ID) is used, the "action" parameter may have values as follows. The service identifier is equal to an MIH frame identifier defined by 802.21 WG. If the service identifier is 1, it means a system management MIH frame, wherein the "action" parameter is set at "MIH protocol-I. The MIH capability discovery MIH frame may be identified as the system management MIH frame. If the service identifier is 2, it means an event service MIH frame. If the service identifier is 3, it means a command service MIH frame. In this case, the "action" parameter is set at "MIH protocol-II. If the service identifier is 4, it means an information service MIH frame, wherein the "action" parameter is set at "MIH protocol-III."

The action frames set at "MIH protocol-I" and "MIH protocol-III" can be determined that they are effective in states 1, 2 and 3. The action frame set at "MIH protocol-II" can be determined that it is effective in state 3 only. The service identifiers of the event service MIH frame and the command service MIH frame may represent 2 equally. In this case, the "action" parameter is set at MIH protocol-II. The information service MIH frame has the service identifier of 3 and the "action" parameter is set at MIH protocol-Ill. This is only exemplary, and the MIHF entity notifies 802.11 MAC of a service identifier of the forwarded MIH frame so that the "action" parameter of the action frame is variably set. Also, if the MIHF frame which is not suitable for state 1, state, 2 and state 3 has been transmitted, it is possible to determine whether to transmit the corresponding MIHF frame to the AP. The receiving party identifies types of the MIH frames through the "action" parameters after receiving the action frames, and processes transmission messages to be suitable for state 1, state 2, and state 3. Also, the receiving party can identify service types without decoding the MIHF frame and forward the MIHF frame to the MIHF entity.

The remote request broker (RRB) exists in a system management entity (SME) of the AP and enables communication between APs existing in one mobility domain. In other words, APs which own equal mobility domain ID are logically connected with one another through a DS and support communication through the DS. The RRB generates or relays the remote request/response frames between the current AP and the next candidate AP.

The remote request/response frames will be described below. The remote request broker of the current connection point receives the MIH protocol action frame from the mobile terminal and then transmits the MIH protocol action frame to the MIHF entity by encapsulating the MIH protocol action frame in the remote request frame. The current AP which is connected with the mobile terminal and with which the mobile terminal intends to connect transmits the remote request/response messages along with the connection status of the mobile terminal.

The status of the mobile terminal, which can be transmitted, is as follows.

0x00 (State 1: Before attachment)—before any resources or state for the client are established in the network. In IEEE 802.11, this is equivalent to pre-association.

0x01 (State 2: Before authentication)—when data can be exchanged over the IEEE 802.1X uncontrolled port. At this point, the protocol frames may be at a slightly higher layer, but the information that may be exchanged is still limited.

0x02 (State 3: After authentication)—when data can be exchanged over the IEEE 802.1x controlled port. At this point, any information can be exchanged.

The AP may discard the action frame transmitted thereto depending on the status of the mobile terminal. Alternatively, the AP may transmit the status of the mobile terminal along with the remote request message. The entity which has received the remote request message performs proper processing, such as discarding the remote request message, depending on the status of the mobile terminal, which is included in the remote request message.

Formats of the remote request/response frames transmitted through the DS are as shown in Table 7, and are transmitted to Ethertype xx to be allocated by actual IANA.

TABLE 7

| Size | Field | Description |
| --- | --- | --- |
| 1 | Protocol Version | Shall be 0x01 |
| 1 | Packet Type | Fast BSS Transition Remote Request: 0x00 |
| | | Fast BSS Transition Remote Response: 0x01 |
| | | MIH Protocol Request: 0x02 |
| | | MIH Protocol Response: 0x03 |
| | | MIH Protocol Indication: 0x04 |
| | | MIH Protocol-I: 0x05 |
| | | MIH Protocol-II: 0x06 |
| | | MIH Protocol-III: 0x07 |
| 2 | Action Length | Action frame Length |
| 1 | Request Identifier | ID for mapping with response frame |
| 6 | AP Address | Address of current AP |
| 1 | STA's Current State | Parameter indicating status of current STA |
| | | Before attachment (State 1): 0x00 |
| | | Before authentication (State 2): 0x01 |
| | | After authentication (State 3): 0x02 |
| Variable | Action Frame | Include Action Frame |

Information elements additionally provided in accordance with the present invention are as shown in Table 8.

TABLE 8

| Information Element | Element ID |
| --- | --- |
| MIHF Entity Information | 62 |
| MIH Capability Discover Request IE | 63 |
| MIH Capability Discover Response IE | 64 |
| MIH Command Service Request IE | 65 |
| MIH Command Service Response IE | 66 |
| MIH Event Indication Service IE | 67 |
| Reserved | 68-255 |

Figure 15:
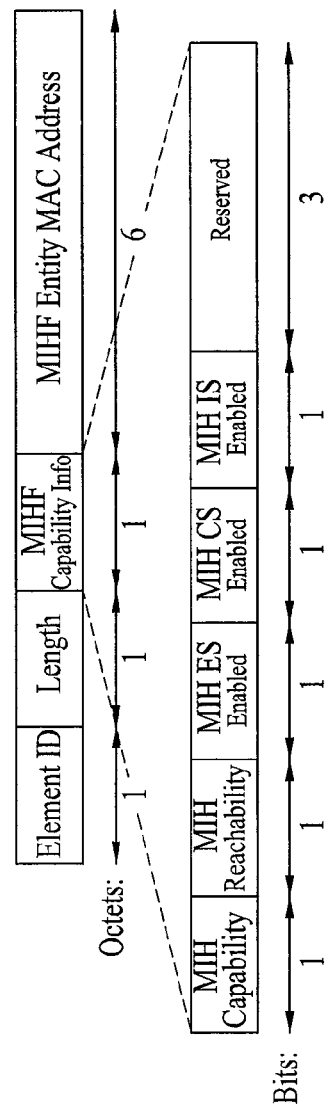
FIG. 15 illustrates a data format of MIHF entity information IE.

FIG. 15 illustrates a data format of MIHF entity information IE. Each parameter shown in FIG. 15 will be described below.

MIH Capability: is a bit indicating whether the current AP is an AP which supports MIHF. If this bit is set to 1, 'MIH Reachability' is not set but 'MIH ES Enabled,' 'MIH CS Enabled,' and 'MIH IS Enabled bit' are set depending on services which support MIHF of the current AP. If MIH ES Enabled,' 'MIH CS Enabled,' and 'MIH IS Enabled bit' are not set but 'MIH Capability' is set, it may mean that another entity which supports MIHF which does not belong to the current AP exists, and the current AP forwards an action frame if the action frame is transmitted to the current AP.

MIH Reachability: is a bit indicating whether there exists an entity which supports MIHF within the DS equal to the current AP. If this bit is set to 1, it indicates that the current AP can relay the MIH protocol action frame if the MIH protocol action frame is transmitted to the current AP. If 'MIH Reachability' bit is set, an MIHF entity MAC address which is an MAC address of an entity which can support MIHF within the DS can be transmitted along with the MIH protocol action frame.

MIH ES Enabled: is set in the case that an MIH capability parameter is set and the MIHF entity of the current AP supports event service.

MIH CS Enabled: is set in the case that an MIH capability parameter is set and the MIHF entity of the current AP supports command service.

MIH IS Enabled: is set in the case that an MIH capability parameter is set and the MIHF entity of the current AP supports information service.

Table 9 illustrates an example of interworking information IE included in a beacon that can identify as to whether the mobile terminal discovers an MIH function capability entity and the AP provides general advertisement service.

TABLE 9

| Order | Size (Octets) | Description |
| --- | --- | --- |
| 1 | 1 | TBD Element ID (to be assigned by the IEEE Assigned Numbers Authority): defines the Extended Capability IE |
| 2 | 1 | Length |
| 3 | 1 | Interworking Capability |

| | |
| --- | --- |
| Bit 0 | TGu Enable |
| Bit 1 | MIH Enable |
| Bit 2 | GAS Enable |
| Bit 3 | ES Enable |
| Bit 4 | CS Enable |
| Bit 5 | IS Enable |

Interworking Capability

TGu Enable: is a bit indicating that those defined in TGu are available.

MIH Enable: is a bit indicating whether the current AP has MIHF (for example, in case of TGu Enable and MIH not Enable, AP is MIHF not enable but has MIHF interface. In this case, the mobile terminal can perform communication with the MIHF entity through the current AP).

GAS Enable: is a bit indicating that the AP can perform a general advertisement service (GAS).

ES Enable: is a bit indicating whether ES is supported. In the case that MIH Enable is not set but this ES Enable bit is set, it indicates that the mobile terminal can perform communication with ES MIHF entity through the current AP.

CS Enable: is a bit indicating whether CS is supported. In the case that MIH Enable is not set but this CS Enable bit is set, it indicates that the mobile terminal can perform communication with CS MIHF entity through the current AP.

0x04: IS Enable: is a bit indicating whether IS is supported. In the case that MIH Enable is not set but this IS Enable bit is set, it indicates that the mobile terminal can perform communication with IS MIHF entity through the current AP.

Table 10 and Table 11 illustrate advertisement request/response IE included in a probe for additional capability discovery of MIH information service or MIHF and information request/acquisition.

TABLE 10

| Field | Size |
|---|---|
| Element ID | Unit 8 |
| Length | Unit 8 |
| Adv Service | Unit 8 |
| Adv Type | Unit 8 |
| Adv Identifier | Unit 8 * 2 |
| SSPN ID #1 | TBD |
| SSPN ID #N | TBD |
| MIH Capability | Unit 8 |
| MIHF IS Frame | TBD |

Adv Service:
- 0: SSPN Advertisement
- 1: MIH Capability Advertisement
- 2: MIH IS Advertisement MIH Capability (같은 "MIH_Capability_Discover.request" Frame):
- 0: ES Enabled
- 1: CS Enabled
- 2: IS Enabled Adv Type
0x00: Ethertype
0x01: well-known port
0x02-255: reserved
Advertisement Identifier: unique value per advertisement type
MIH Capability (Adv Service ->MIH Capability Advertisement): in the case that the current AP supports MIHF, the current AP does not provide MIHF capability. However, in the case that the current AP has MIHF interface, the current AP provides capability information request of ES, CS, and IS of MIHF-AP (MIHF Enabled AP). ES, CS and IS which are supported by the current AP may be only set for the information request so that ES, CS, and IS supported by the AP or MIHF-AP may be provided. The information request can be performed by transmitting MIH_Capability_Discover.request frame and receiving an MIH_Capability_Discover.response frame.
MIHF IS Frame (Adv Service ->MIH IS Advertisement): MISH IS frame for MIH information service request.

TABLE 11

| Field | Size |
|---|---|
| Element ID | Unit 8 |
| Length | Unit 8 |
| Status Code | Unit 8 |
| MIH Capability | Unit 8 |
| Multicast Address | Unit 8 * 6 |
| MIHF-AP Address (optional) | Unit 8 * 6 |

Status Code:
  0x00: successful
  0x01: Request has been declined
  0x02: Service not supported
MIH Capability: provides capability information of ES, CS, and IS of MIHF-AP (MIHF Enabled AP) in the case that AP does not perform MIHF or has MIHF interface.

Multicast Address: is a group broadcast address for providing MIH IS.

MIHF-AP Address: is MIHF Enabled AP's address and allows the mobile terminal to request the MIHF-AP entity to transmit MIHF frame even though the AP does not perform MIHF.

Table 12 illustrates a query response action frame which performs advertisement including information requested by the mobile terminal.

TABLE 12

| Category | Action | Remaining Repetitions | Frag/Pack | AReq1 IE | Adv 1 Length | Advertisement 1 | AReq2 IE | Adv 2 Length | Advertisement 2 | ... |
|---|---|---|---|---|---|---|---|---|---|---|
| 1 | 1 | 1 | 1 | N | 2 | N | N | 2 | N | ... |

| Fragmentation/Packing Status | Sequence Number |
|---|---|

Bits: ←—4—→←—4—→

Category

TABLE 13

| Name | Value | Description |
|---|---|---|
| ... | ... | ... |
| Generic Advertisement Service | | Advertisement |

Action: indicate types of advertisement depending on action field value.
Action field 1: MIH_Capability_Discover response frame is included in advertisement and then transmitted. In this case, AReq IE is omitted and advertisement is transmitted directly after Adv Length.
Action field 2: the Information Service Query response frame is included in advertisement and then transmitted.
Action field 3: the MIH_Capability_Discover.response frame is first transmitted, and AReq IE is omitted. Next, AReq IE and the information service query response frame are transmitted in due order.

TABLE 14

| Action field value | Description |
|---|---|
| 0 | SSPN Advertisement |
| 1 | MIH Capability Advertisement |
| 2 | MIH IS Advertisement |

TABLE 14-continued

| Action field value | Description |
| --- | --- |
| 3 | MIH Capability Advertisement and IS Advertisement are simultaneously included. |
| 4-255 | Reserved |

Remaining Repetitions: the number of times of additionally transmitted advertisement Adv Length: Length of Advertisement Frag/Pack: Fragmentation or Packing of Advertisement. This Frag/Pack may include response advertisement to several types of AReq IE, or the Frag/Pack including response advertisement to several types of AReq IE may be transmitted in fragmentation. First 4 bits represent the status of packing and fragmentation, and the other 4 bits represent a sequence number. The sequence number is used when respective packets transmitted in fragmentation are combined with one another.

Fourth bit: indicates as to whether Packeting is used.

Third bit: indicates as to whether intermediate of advertisement is cut.

Second bit and first bit: indicate fragmentation and as to whether this is first, intermediate, or last fragmentation.

0000: neither Packing nor Fragmentation is used.

0001: Packing is not used. Fragmentation is used (first fragment).

0010: Packing is not used. Fragmentation is used (intermediate fragment).

0011: Packing is not used. Fragmentation is used (last fragment).

1000: packing is used for two or more advertisements, and Fragmentation is not used.

1001: packing is used for two or more advertisements, and Fragmentation is used (first fragment).

1010: packing is used for two or more advertisements, and Fragmentation is used (intermediate fragment).

1011: packing is used for two or more advertisements, and Fragmentation is used (last fragment).

x0xx: fragment is used at the end of advertisement and starts from new AReq IE.

x1xx: fragment is used at the middle of advertisement and IE indicating length of advertisement follows immediately.

The following shows a format of the action frame when the Frag/Pack is the intermediate fragment or the last fragment during fragmentation. Fragmentation can be used at advertisement. Namely, fragmentation can be used at the middle of advertisement or at the time when advertisement ends.

When fragmentation is used at the end of advertisement, although fragmentation is illustrated for only one advertisement in accordance with the embodiment of the present invention, fragmentation may be used for several advertisements.

TABLE 15

| Category | Action | Remaining Repetitions | Frag/Pack | AReq IE | Adv 1 Length | Advertisement 1 |
| --- | --- | --- | --- | --- | --- | --- |
| 1 | 1 | 1 | 1 | N | 2 | N |

When fragmentation is used at the middle of advertisement, although fragmentation is illustrated for only one advertisement in accordance with the embodiment of the present invention, fragmentation may be used for several advertisements.

TABLE 16

| Category | Action | Remaining Repetitions | Frag/Pack | Adv 1 Length | Advertisement 1 |
| --- | --- | --- | --- | --- | --- |
| 1 | 1 | 1 | 1 | 2 | N |

When two fragments are only provided, an action frame which indicates a first fragment and the last fragment without indicating an intermediate fragment is transmitted.

Advertisement: is requested information. In the case that the action field value is 1, it includes MIH_Capability_Discover.response frame. In the case that the action field value is 2, it includes Information service query response frame.

As another example of the data format shown in FIG. 15, a flag which is a fixed parameter of a beacon and indicates MIH capability can be set to 1 bit. If the flag is set, MIHF entity information IE of FIG. 15 is included in the beacon and then transmitted. In this case, MIH capability of MIHF entity information IE is not included in the beacon and is replaced by the fixed parameter.

Figure 16:
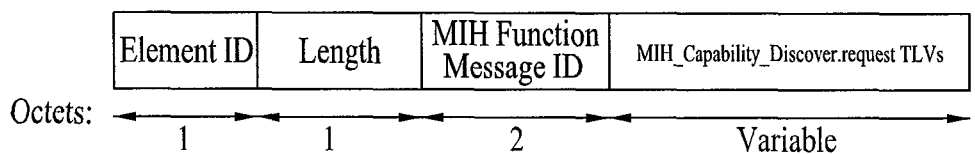
FIG. 16 illustrates a data format of MIH capability discovery request IE.

FIG. 16 illustrates a data format of MIH capability discovery request IE. Each parameter of FIG. 16 will be described below.

MIH Function Message ID: is ID corresponding to MIH capability discovery prescribed by IEEE 802.21.

MIH_Capability_Discover.request: includes TLVs prescribed by IEEE 802.21.

Figure 17:
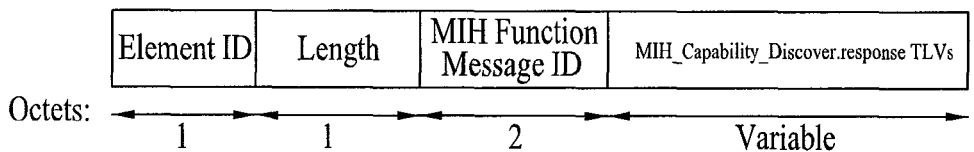
FIG. 17 illustrates a data format of MIH capability discovery response IE.

FIG. 17 illustrates a data format of MIH capability discovery response IE. Each parameter of FIG. 17 will be described below.

MIH Function Message ID: is ID corresponding to MIH capability discovery prescribed by IEEE 802.21.

MIH_Capability_Discover.request: includes TLVs prescribed by IEEE 802.21.

Figure 18:
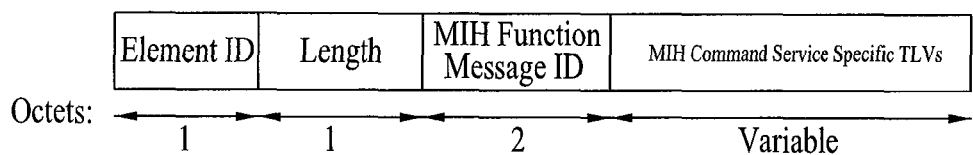
FIG. 18 illustrates a data format of MIH command service request IE.

FIG. 18 illustrates a data format of MIH command service request IE. Each parameter of FIG. 18 will be described below.

MIH Function Message ID: is ID of command service prescribed by IEEE. 802.21 and includes ID corresponding to command intended to be transmitted.

MIH Command Service Specific TLVs: TLVs of command request intended to include, and includes TLVs of corresponding command request prescribed by MIH protocol of IEEE 802.21.

Figure 19:
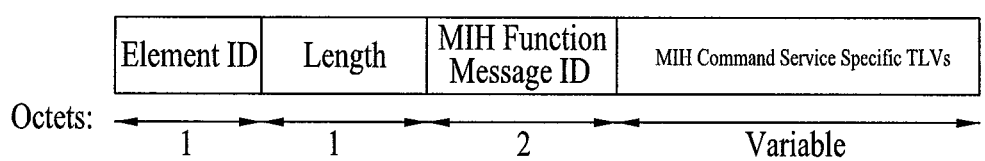
FIG. 19 illustrates a data format of MIH command service response IE.

FIG. 19 illustrates a data format of MIH command service response IE. Each parameter of FIG. 19 will be described below.

MIH Function Message ID: is ID of command service prescribed by IEEE. 802.21 and includes ID corresponding to command intended to be transmitted.

MIH Command Service Specific TLVs: TLVs of command response intended to include, and includes TLVs of corresponding command response prescribed by MIH protocol of IEEE 802.21.

Figure 20:
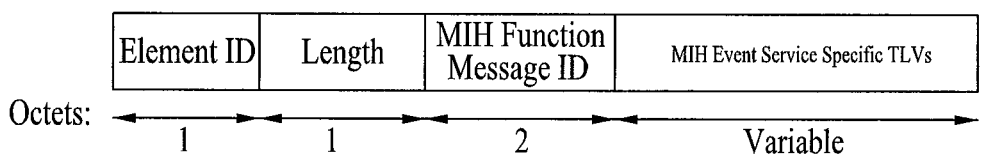
FIG. 20 illustrates a data format of MIH event service indication IE.

FIG. 20 illustrates a data format of MIH event service indication IE. Each parameter of FIG. 20 will be described below.

MIH Function Message ID: is ID of event service prescribed by IEEE. 802.21 and includes ID corresponding to event intended to be transmitted.

MIH Event Service Specific TLVs: are TLVs of event intended to include, and include TLVs of corresponding event prescribed by MIH protocol of IEEE 802.21.

Hereinafter, primitives additionally provided in accordance with the present invention will be described.

(1) MLME-MIHCapaDiscovery.request Primitive

1) Function

MLME-MIHCapaDiscovery.request primitive is used to allow the upper management entity of the mobile terminal or the MIH layer to request the MAC layer of the presence of the MIHF entity in the DS equivalent to the AP and event and command service information which is supported.

2) Semantics

MLME-MIHCapaDiscovery.request (
  SourceIdentifier,
  DestinationIdentifer
  MIH Capability Discover Request IE
)

TABLE 17

| Name | Type | Valid range | Description |
| --- | --- | --- | --- |
| SourceIdentifier | Identifier | Any valid identifier | Source id which the request is issued in |
| DestinationIdentifier | Identifier | Any valid identifier | Destination id which the request is sent to |
| MIH Capability Discover Request IE | | | |

3) Generation Timing Point

This primitive is generated by the upper management entity of the mobile terminal or the MIH layer, and may be generated at any time before the mobile terminal tries handover between heterogeneous networks.

4) Effect During Reception

The MAC layer of the mobile terminal transmits the MIH Capability Discovery Request action frame to the AP after receiving the MLME-MIHCapaDiscovery.request primitive.

(2) MLME-MIHCapaDiscovery.Indication Primitive

1) Function

MLME-MIHCapaDiscovery.Indication primitive is used to allow the MAC layer requests the MIH layer or the upper management entity as to whether MIH is supported and event and command service information which is supported after the counter entity of the mobile terminal, i.e., MIHF entity receives the MLME-MIHCapaDiscovery.request.

2) Semantics

MLME-MIHCapaDiscovery.Indication (
  SourceIdentifier,
  DestinationIdentifer
  MIH Capability Discover Request IE
)

TABLE 18

| Name | Type | Valid range | Description |
| --- | --- | --- | --- |
| SourceIdentifier | Identifier | Any valid identifier | Source id which the Indication is issued in |
| DestinationIdentifier | Identifier | Any valid identifier | Destination id which the Indication is sent to |
| MIH Capability Discover Request IE | | | |

3) Generation Timing Point

This primitive is generated after the MAC layer of the MIHF entity receives the MLME-MIHCapaDiscovery.request.

4) Effect During Reception

The MIH layer of the MIHF entity or the upper management entity generates the MLME-MIHCapaDiscovery.response.

(3) MLME-MIHCapaDiscovery.response

1) Function

The upper management entity or the MIH layer of the MIHF entity transmits MIH Capability Discover Response IE including event and command list information supported by the MIHF entity to the MAC layer.

2) Semantics

MLME-MIHCapaDiscovery.response (
  SourceIdentifier,
  DestinationIdentifer
  MIH Capability Discover Response IE
)

TABLE 19

| Name | Type | Valid range | Description |
| --- | --- | --- | --- |
| SourceIdentifier | Identifier | Any valid identifier | Source id which the response is issued in |
| DestinationIdentifier | Identifier | Any valid identifier | Destination id which the response is sent to |
| MIH Capability Discover Response IE | | | |

3) Generation Timing Point

This primitive is generated after the upper management system or the MIH layer of the MIHF entity receives the MLME-MIIHCapaDiscovery.Indication.

4) Effect During Reception

The MIH capability response action frame is generated and then included in a remote response and the MIH capability request action frame is included in a remote request, so that the action frames are transmitted to a transmitter. Alternatively, the MIH capability response action frame is directly transmitted to the transmitter.

(4) MLME-MIHCapaDiscovery.confirm

1) Function

The MLME-MIHCapaDiscovery.confirm primitive is used to allow the MAC layer of the mobile terminal to transmit information contained in the MIH capability response action frame to the MIH layer or the upper management entity.

2) Semantics

MLME-MIHCapaDiscovery.confirm (
  SourceIdentifer,
  DestinationIdentifier,
  MIH Capability Discover Response IE
)

TABLE 20

| Name | Type | Valid range | Description |
| --- | --- | --- | --- |
| SourceIdentifier | Identifier | Any valid identifier | Source id which the confirm is issued in |

TABLE 20-continued

| Name | Type | Valid range | Description |
| --- | --- | --- | --- |
| DestinationIdentifier | Identifier | Any valid identifier | Destination id which the confirm is sent to |
| MIH Capability Discover Response IE | | | |

3) Generation Timing Point

This primitive is generated by the MAC layer of the mobile terminal and after the MAC layer receives the MIH capability discovery response action frame from the AP.

4) Effect During Reception

The MIH layer or the upper management entity of the mobile terminal acquires information as to whether the MIHF entity located within the DS equivalent to the AP supports MIH and event and event and command service information which is supported.

(5) MLME-SCAN.confirm Primitive (Corrected in Accordance with the Present invention)

```
MLME-Scan.confirm (
BSSDescriptionSet,
ResultCode
MIHF Capability
MIHF Entity Information
Interworking Capability
)
```

MIHF Capability: is a bit fixed to a beacon. If an identifier indicating the MIHF capability exists, the MIHF Capability indicates as to whether the identifier is set.

MIHF Entity Information: includes MIH Entity Information IE received through a beacon. The MIHF Entity Information may include the whole MIH Entity Information IE or selectively include parameters.

Interworking Capability: indicates capability supported by networks.

TGu Enable: is a bit indicating that those defined by TGu are available.

MIH Enable: is a bit indicating as to whether the current AP has MIH function (for example, in case of TGu Enable and MIH not Enable, AP is MIHF not enable but has MIHF Interface, and the mobile terminal can perform communication with the MIHF entity through the current AP).

GAS Enable: corresponds to the case where the AP can perform general advertisement service (GAP).

ES Enable: indicates as to whether ES is supported. If MIH Enable is not set but this ES Enable bit is set, this ES Enable bit indicates that the mobile terminal can perform communication with ES MIHF entity through the current AP.

CS Enable: indicates as to whether CS is supported. If MIH Enable is not set but this CS Enable bit is set, this CS Enable bit indicates that the mobile terminal can perform communication with CS MIHF entity through the current AP.

IS Enable: indicates as to whether IS is supported. If MIH Enable is not set but this IS Enable bit is set, this IS Enable bit indicates that the mobile terminal can perform communication with IS MIHF entity through the current AP.

(6) MLME-MIHProtocol.request

1) Function

The MLME-MIHProtocol.request primitive is used to remotely transmit MIHF frame or request frame to the MAC layer when the MIH layer of the mobile terminal or the upper management entity is intended to remotely forward MIH message or link network information request message.

2) Semantics

```
MLME-MIHProtocol.request (
Category,
Action,
STA Address,
Destination Address,
Service ID,
MIHF Frame
)
```

TABLE 20

| Name | Type | Valid range | Description |
| --- | --- | --- | --- |
| Category | Enumeration | MIH Protocol | |
| Action | Enumeration | MIH Capability Discover Reqeust, MIH Capability Discover Response, MIH Command Service Request, MIH Command Service Indication MIH Event Service Indication, MIH Protocol-I MIH Protocol-II MIH Protocol-III | Values setting "Action" parameters which determine action frame |
| STA Address | MAC Address | N/A | MAC address of mobile terminal |
| Destination Address | MAC Address | N/A | MAC address of MIHF to be transmitted. If this address is known through beacon, this address is used, but, if |

TABLE 20-continued

| Name | Type | Valid range | Description |
|---|---|---|---|
| Service ID | | 1. System Management<br>2. Event Service<br>3. Command Service<br>4. Information Service | unknown, broadcast address is used.<br>MIH service identifier |
| MIHF Frame | | N/A | Body of MIH message to be transmitted |

3) Generation Timing Point

This primitive is generated by the MIH layer of the mobile terminal, and may be generated at any time if MIH function is required.

4) Effect During Reception

The MAC layer of the mobile terminal generates the MIH protocol action frame and transmits the generated MIH protocol action frame to either the AP or the entity which supports MIHF.

(7) MLME-MIHProtocol.Indication

1) Function

The MLME-MIHProtocol.indication primitive is used to allow the MAC layer of the MIHF entity (entity which supports MIH function) to transmit contents of the MIH function frame to the MIH layer.

2) Semantics

```
MLME-MIHProtocol.indication (
Category,
Action,
STA Address,
Destination Address,
Service ID,
MIHF Frame
)
```

TABLE 22

| Name | Type | Valid range | Description |
|---|---|---|---|
| Category | Enumeration | MIH Protocol | |
| Action | Enumeration | MIH Capability Discover Request,<br>MIH Capability Discover Response,<br>MIH Command Service Request,<br>MIH Command Service Indication,<br>MIH Event Service Indication,<br>MIH Protocol-I<br>MIH Protocol-II<br>MIH Protocol-III | Values setting "Action" parameters which determine action frame |
| STA Address | MAC Address | N/A | MAC address of mobile terminal |
| Destination Address | MAC Address | N/A | Destination address set in action frame transmitted |
| Service ID | | 1. System Management<br>2. Event Service<br>3. Command Service<br>4. Information Service | MIH service identifier |
| MIHF Frame | | N/A | Body of MIH message included in action frame transmitted |

3) Generation Timing Point

This primitive is generated after the MAC layer of the MIHF entity, i.e., the MIHF entity in networks or the MIHF entity of the mobile terminal receives the MIH protocol action frame.

4) Effect During Reception

The MIH layer of the MIHF entity can receive the MIH function frame remotely transmitted.

(8) MLME-Advertisement.request

1) Function

The MLME-Advertisement.request primitive is used to remotely transmit the MIHF frame or the request frame to the MAC layer when the MIH layer of the mobile terminal or the upper management entity is intended to remotely forward MIH message or link network information request message. Contents transmitted by the MLME-Advertisement.request primitive are set in the MIH protocol action frame or advertisement request IE of the probe request as parameters and then transmitted to the AP.

2) Semantics

MLME-Advertisement.request (
Advertisement Service,
Advertisement Type,
Advertisement Identifier,
MIHF Frame
)

TABLE 23

| Name | Type | Valid range | Description |
| --- | --- | --- | --- |
| Advertisement Service, | Enumeration | 0: SSPN Advertisement<br>1: MIH Capability Advertisement<br>2: MIH IS Advertisement | |
| Advertisement Type, | Enumeration | 0: Ethertype<br>1: well-known port<br>2~255: reserved | |
| Advertisement Identifier, | | | Unique value per advertisement type |
| MIHF Frame | N/A | | Body of MIH message to be transmitted. Service 1: includes MIH_Capability_Discovery.request frame in case of MIH Capability Advertisement, and includes MIH IS query frame in case of Service 2. |

3) Generation Timing Point

This primitive is generated by the MIH layer of the mobile terminal and the upper management entity and when it is desired to acquire network link information or discover capability of the entity which supports MIH.

If information is requested through the probe request, parameters are transmitted before the probe request is transmitted. This is an access status of an initial network which is not associated with the AP.

4) Effect During Reception

The MAC layer of the mobile terminal generates a probe request including advertisement request IE or MIH protocol action frame and transmits the generated probe request to the AP. In this case, the advertisement request IE includes information transmitted from this MLME-Advertisement request primitive.

(9) MLME-Advertisement.Indication

1) Function

The MLME-Advertisement.indication primitive is used to allow the AP to transmit broadcast advertisement or multicast advertisement to the MIHF entity or the upper management entity.

2) Semantics

```
MLME-Advertisement.indication (
Advertisement Request IE
Action
Advertisement
)
```

3) Generation Timing Point

This primitive is generated to transmit query response action frame information to the MIH entity or the upper management entity after the MAC layer receives the query response action frame from the network.

4) Effect During Reception

The MIH entity or the upper management entity can receive requested information from the entity which owns corresponding information.

(10) MLME-Advertisement.response

1) Function

The MLME-Advertisement.response primitive is used to allow the AP to transmit information of advertisement response IE included in the probe response to the MIHF entity or the upper management entity.

2) Semantics

```
MLME-Advertisement.response(
Status Code
MIH Capability
Multicast Address
MIHF-AP Address (optional)
)
```

TABLE 24

| Name | Type | Valid range | Description |
|------|------|-------------|-------------|
| Advertisement Request IE | N/A | | Service 1 transmitted along with MLME-Advertisement.request: MIH_Capability_Discovery.request frame in case of MIH Capability Advertisement In case of Service 2, MIH IS query frame is transmitted. |
| Action | Enumeration | 0: SSPN Advertisement 1: MIH Capability Advertisement 2: MIH IS Advertisement | Value in action field of action frame and indicates types of Advertisement. 0: general SSPN advertisement 1: MIH Capability advertisement, and may include MIH_Capability_Discovery.response frame 2: response to Information Service query, and includes information service response frame. |
| Advertisement | N/A | | Types of frame are varied depending action. 1: MIH_Capability_Discovery.response 2: Information Service Query response frame |

1: MIH_Capability_Discovery.response

TABLE 25

| Name | Type | Valid range | Description |
| --- | --- | --- | --- |
| Status Code | Enumeration | 0x00: successful<br>0x01: request has been accepted<br>0x02: request has been declined<br>0x03: service not supported<br>0x04: $1^{st}$ request SSPN information doesn't exist<br>0x05: $2^{nd}$ request SSPN information doesn't exist<br>0x06: $3^{rd}$ request SSPN information doesn't exist ... | Indicates requested result through Advertisement request IE |
| MIH Capability | | 0: ES enabled<br>1: CS enabled<br>2: IS enabled | Indicates types of MIHF entity through current AP, which can be connected with the current AP through set interface. |
| Multicast Address | | | Multicast address to which query response will be transmitted |
| MIHF-AP Address | | | Includes address of entity having MIH function in the equivalent DS. |

3) Generation Timing Point

This primitive is generated to transmit probe response including advertisement response IE to the MIH entity or the upper management entity after the MAC layer receives the probe response from the network.

4) Effect During Reception

The MIH entity or the upper management entity can receive additional function of the AP and multicast address to which information of the MIHF entity or information requested after a certain time will be forwarded.

It will be apparent that constitution, operation, and features of the present invention will easily be understood by the preferred embodiments of the present invention, which will be described with reference to the accompanying drawings.

To relay the action frame, in the case that the mobile terminal receives MAC address of the entity, which can support MIHF within the DS equivalent to the current AP, through a beacon, the AP inserts the MAC address to a destination address when the mobile terminal generates the action frame. In the case that the mobile terminal does not know address information of the entity with the DS, which supports MIHF, the mobile terminal, the mobile terminal encapsulates the address in a certain value, for example, broadcast address and forwards the address to the AP, so that the AP broadcasts the address into the DS, thereby allowing the entity which can support MIHF to transmit the address. Alternatively, in the case that the AP knows the address of the entity which can support MIHF within the DS, the AP can forward the address of the entity which can support MIHF regardless of the fact that the mobile terminal transmits the destination address by encapsulating the destination address in a broadcast address or a null address. More alternatively, the AP may transmit the MAC address in such a manner that the AP generates an Ethernet frame in a remote request/response message with a right destination which it knows without shifting the action frame transmitted from the mobile terminal, and may encapsulate a packet transmitted from the mobile terminal of the wireless LAN in the Ethernet frame.

The entity which can support MIHF could be one AP within the DS. In this case, if the mobile terminal of the wireless LAN, which is connected with the AP, transmits the MIH protocol action frame, the AP transmits the MIH protocol action frame to its MIHF entity without transmitting the same to the DS.

Figure 21:
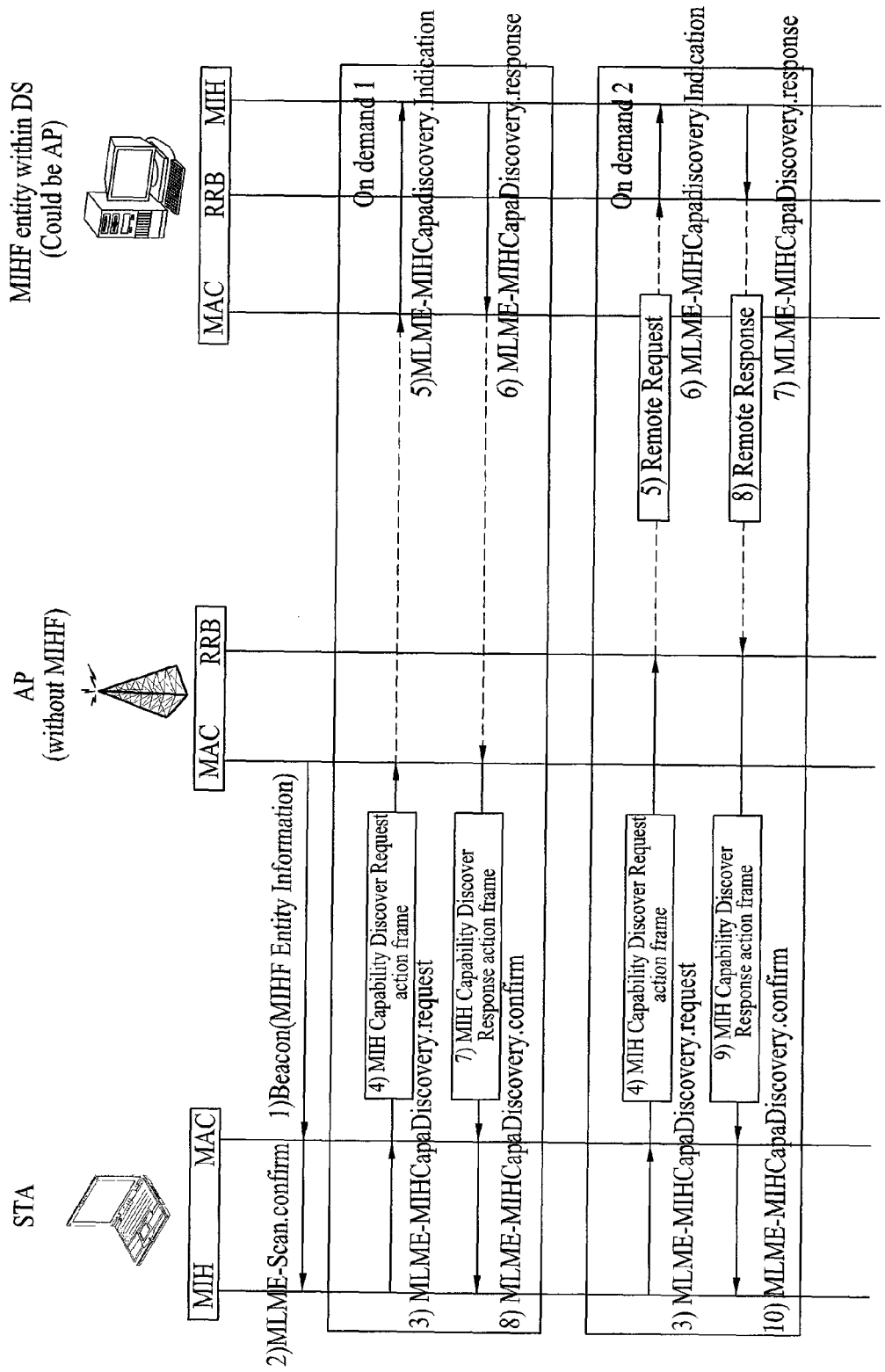
FIG. 21 to FIG. 28 are flow charts illustrating procedures according to the embodiments of the present invention.

FIG. 21 is a flow chart illustrating a procedure according to the preferred embodiment of the present invention. Referring to FIG. 21, an example of an on-demand method through exchange of MIH capability discovery request/response action frames will be described. The mobile terminal transmits the MIH action request message and receives a response message to the MIH action request message to perform the MIH capability discovery procedure. An on-demand method 1 and an on-demand method 2 will be described depending on a method of transmitting and receiving the MIH capability discovery request/response action frame between the AP and the MIHF entity.

It is assumed that the current AP of the mobile terminal with MIH is not supported by MIHF, belongs to the DS equivalent to that of one MIHF entity which supports MIHF, and knows address of the MIHF entity belonging to the equivalent DS, through a certain procedure.

The on-demand method 1 corresponds to the case where the MIH capability discovery request action frame is relayed to the MIHF entity by the AP.

The MIHF entity information IE of the beacon is transmitted from the AP to the mobile terminal along with MIHF related information. Once the mobile terminal receives the above information, the mobile terminal can identify as to whether the current AP supports MIHF or whether an entity which supports MIHF exists in the DS equivalent to the current AP. If the entity which supports MIHF exists in the DS equivalent to the current AP, MAC address of the entity which supports MIHF may be transmitted along with the beacon (1). The MAC layer of the mobile terminal which has received the beacon forwards MLME-Scan.confirm to the MIH layer along with the MIHF entity information IE received through the beacon (2). The MIH layer transmits the MLME-MIH-CapaDiscovery.request primitive to the MAC layer and starts MIH capability discovery procedure to discover event or command information which is supported by the MIHF entity (3). The MAC layer of the mobile terminal transmits the MIH capability discovery request action frame to the AP after receiving the MLME-MIHCapaDiscovery.request. The MIH capability discovery request IE within the MIH capability discovery request action frame may include event and command list information which is supported by the mobile terminal. The AP shifts a 'Destination Address' field within the MIH capability discovery request action frame to an MIHF entity address and forwards the MIH capability discovery request action frame to the MIHF entity (4). The MAC layer of the MIHF entity, which has received the MIH capability discovery request action frame, transmits the MLME-MIH- CapaDiscovery.indication primitive to the MIH layer along with information of the MIH capability discovery request action frame (5).

The MIH layer of the MIHF entity transmits the MLME-MIHCapaDiscovery.response primitive containing an event and command list to the MAC layer, wherein the event and command list is supported by the MIHF entity (6). The MAC layer of the MIHF entity transmits the MIH capability discovery response action frame including the MIH capability discovery request IE to the AP, wherein the MIH capability discovery request IE includes the event and command list information. At this time, the destination address is the AP address. The AP fills STA address in % the destination address field and then transmits the MIH capability discovery response action frame to the MAC layer of the STA (7). The MAC layer of the STA transmits the MLME-MIHCapaDiscovery.confirm primitive to the MIH layer to transmit information received through the MIH capability discovery response action frame (8).

Even though the current AP is of service to the mobile terminal cannot perform MIHF, the mobile terminal can acquire MIH capability information by transmitting the MIH action request/response messages to the MIHF entity existing within the equivalent DS, through the above procedures. If the current AP is an entity which supports MIHF, the MIHF entity of the current AP responds without the procedures (5) and (6) of FIG. 21.

The on-demand method 2 corresponds to the case where the MIH capability discovery request/response action frame is transmitted from the current AP to the MIHF entity within the DS through the remote request/response.

The procedures (1) to (4) of the on-demand method 2 are the same as those of the on-demand method 1. The MIH capability discovery request action frame is transmitted to the RRB of the AP, and the RRB of the AP transmits the MIH action request frame to the RRB of the MIHF entity by encapsulating the MIH action request frame in the remote request frame. At this time, the destination address within the encapsulated MIH action request frame is STA address. The remote request frame is transmitted within the equivalent DS, and a response time to the remote request message may be limited by a prescribed policy of the RRB (5). The RRB of the MIHF entity transmits the MLME-MIHCapaDiscovery.indication primitive to the MIH layer (6). The MIH layer of the MIH entity transmits the MLME-MIHCapaDiscovery.response primitive to the RRB in response to the MLME-MIHCapaDiscovery.indication. The MLME-MIHCapaDiscovery.response primitive includes event and command list information which is supported by the MIHF entity (7). The RRB of the MIHF entity constitutes the remote response frame, and transmits the MIH capability discovery response action frame to the RRB of the AP by encapsulating the MIH capability discovery response action frame. The MIH capability discovery response action frame includes information received through the MLME-MIHCapaDiscovery.response primitive (8). The RRB of the AP decapsulates the MIH capability discovery response action frame and transmits the MIH capability discovery response action frame to the MAC layer of the mobile terminal (9). The MAC layer of the STA transmits the MLME-MIHCapaDiscovery.confirm primitive to the MIH layer to transmit information received through the MIH capability discovery response action frame (10).

Figure 22:
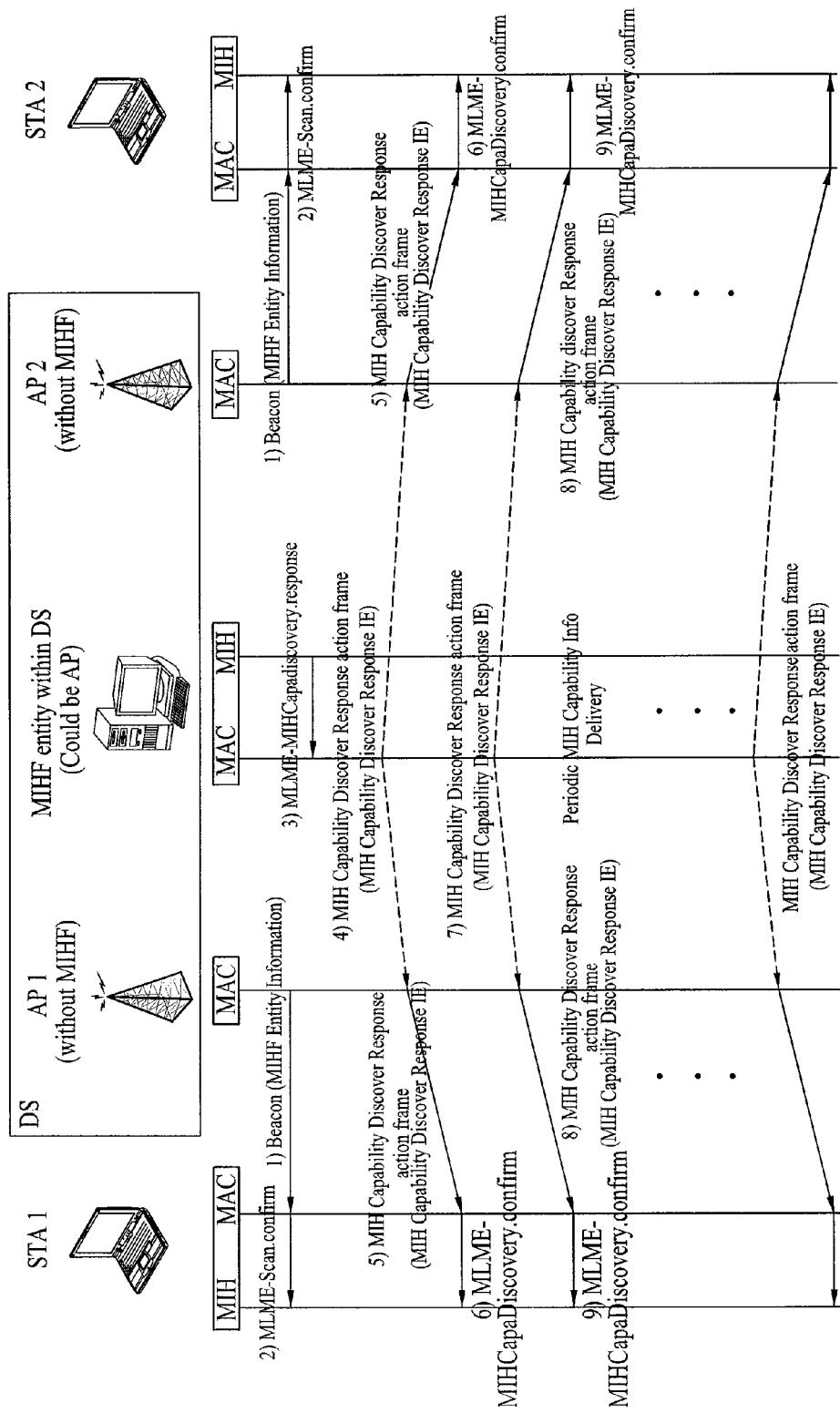

FIG. 22 is a flow chart illustrating another procedure according to the preferred embodiment of the present invention. Referring to FIG. 22, unsolicited MIH capability discovery response action frame is broadcast.

The MIHF entity information IE of the beacon is transmitted from the AP to the mobile terminal along with MIHF related information. Once the mobile terminal receives the above information, the mobile terminal can identify as to whether the current AP supports MIHF or whether an entity which supports MIHF exists within a DS equivalent to the current AP. If the entity which supports MIHF exists within the DS equivalent to the current AP, MAC address of the entity which supports MIHF may be transmitted along with the beacon (1). The MAC layer of the mobile terminal which has received the beacon forwards MLME-Scan.confirm primitive to the MIH layer along with the MIHF entity information. Since this message does not include MIH capability information of the MIHF entity directly, the mobile terminal should start the MIH capability discovery procedure again. However, the MIHF entity within the DS advertises its MIH capability information through the procedures performed after (3) to omit the MIH capability discovery procedure of the mobile terminal (2). The MIH layer of the MIHF entity transmits the MLME-MIHCapaDiscovery.response primitive to the MAC layer along with MIH capability discovery response IE indicating MIH capability information of the MIH entity (3). The MAC layer of the MIHF entity broadcasts the MIH capability discovery response action frame to all the APs within the DS. The broadcast message includes information received through the MLME-MIHCapaDiscovery.response primitive (4). The APs which have received the MIH capability discovery response action frame transmit the frame to the MAC layer of the mobile terminal (5). The MAC layer of the mobile terminal transmits the MLME-MIHCapaDiscovery.confirm primitive to MIH layer, wherein the MLME-MIHCapaDiscovery.confirm primitive includes the information received from the MIH capability discovery response action frame (6). Procedures (7) to (9) are performed in the same manner as the procedures (4) to (6) and are repeated at constant time intervals.

Figure 23:
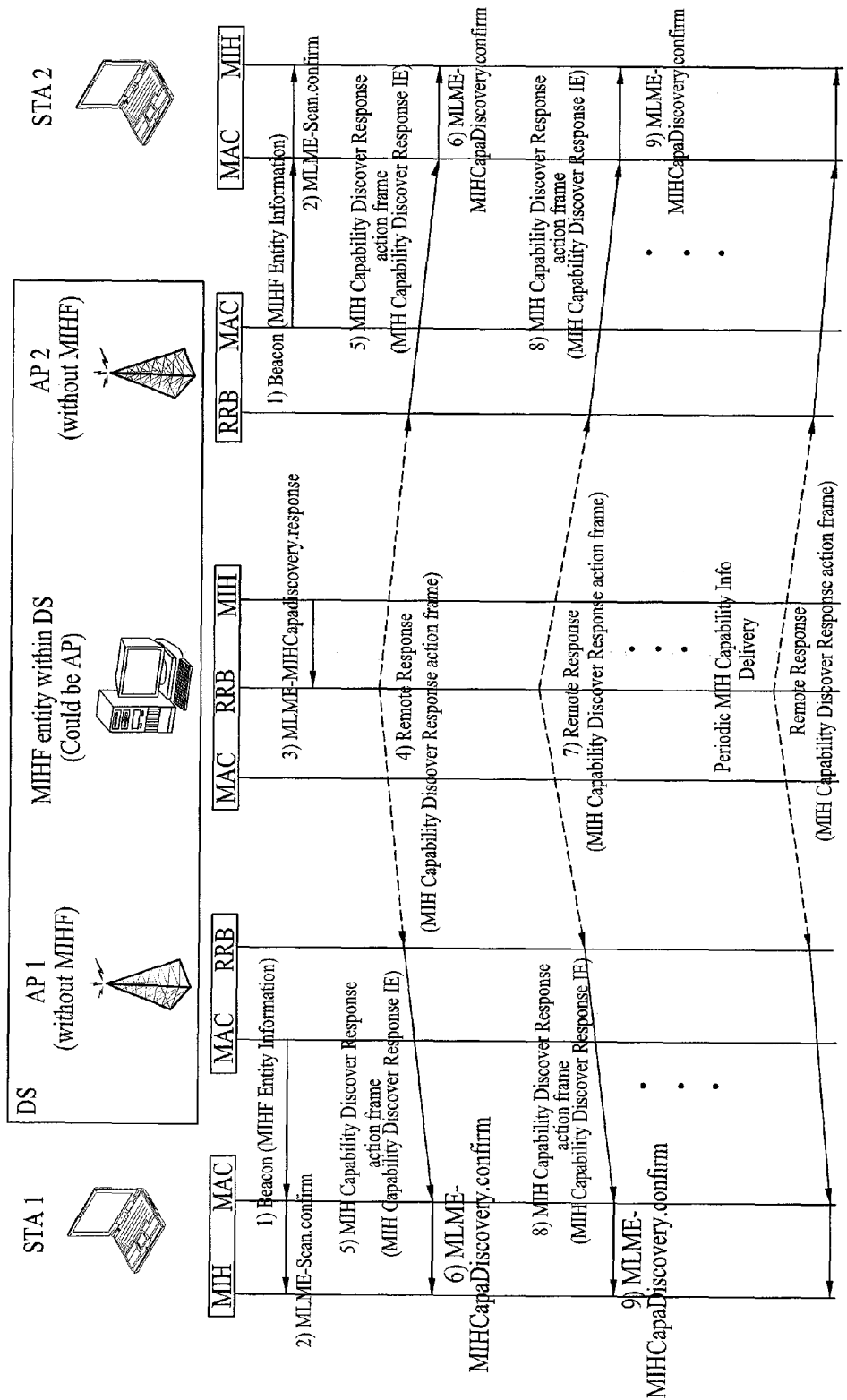

FIG. 23 is a flow chart illustrating another procedure according to the preferred embodiment of the present invention. Referring to FIG. 23, unsolicited remote response is broadcast.

The MIHF entity information IE of the beacon is transmitted from the AP to the mobile terminal along with MIHF related information. Once the mobile terminal receives the above information, the mobile terminal can identify as to whether the current AP supports MIHF or whether an entity which supports MIHF exists within the DS equivalent to the current AP. If the entity which supports MIHF exists within the DS equivalent to the current AP, MAC address of the entity which supports MIHF may be transmitted along with the beacon (1). The MAC layer of the mobile terminal which has received the beacon forwards MLME-Scan.confirm primitive to the MIH layer along with the MIHF entity information.

Since this message does not include MIH capability information of the MIHF entity directly, the mobile terminal should start the MIH capability discovery procedure again. However, the MIHF entity within the DS advertises its MIH capability information through the procedures performed after (3) to omit the MIH capability discovery procedure of the mobile terminal (2). The MIH layer of the MIHF entity transmits the MLME-MIHCapaDiscovery.response primitive to the RRB along with event and command list information which is supported by the MIHF entity (3). The RRB constitutes the remote response frame which encapsulates the MIH capability discovery response action frame and broadcasts the remote response frame to all the APs within the DS (4). The RRB of each AP decapsulates the MIH action response frame and broadcasts the MIH action response frame to the MAC layer of the mobile terminal to transmit MIH capability information received from the MIH entity (5). The MAC layer of the mobile terminal transmits the MLME-MIHCapaDiscovery.confirm primitive to the MIH layer, wherein the MLME-MIHCapaDiscovery.confirm primitive includes the information received from the MIH capability discovery response action frame (6). Procedures (7) to (9) are performed in the same manner as the procedures (4) to (6) and are repeated at constant time intervals.

As another embodiment, when the APs receive the remote response or the MIH capability discovery response action frame directly, wherein the remote response includes the MIH capability discovery response action frame advertised by the entity which can support MIHF within the DS, such received information can be transmitted along with the beacon.

Figure 24:
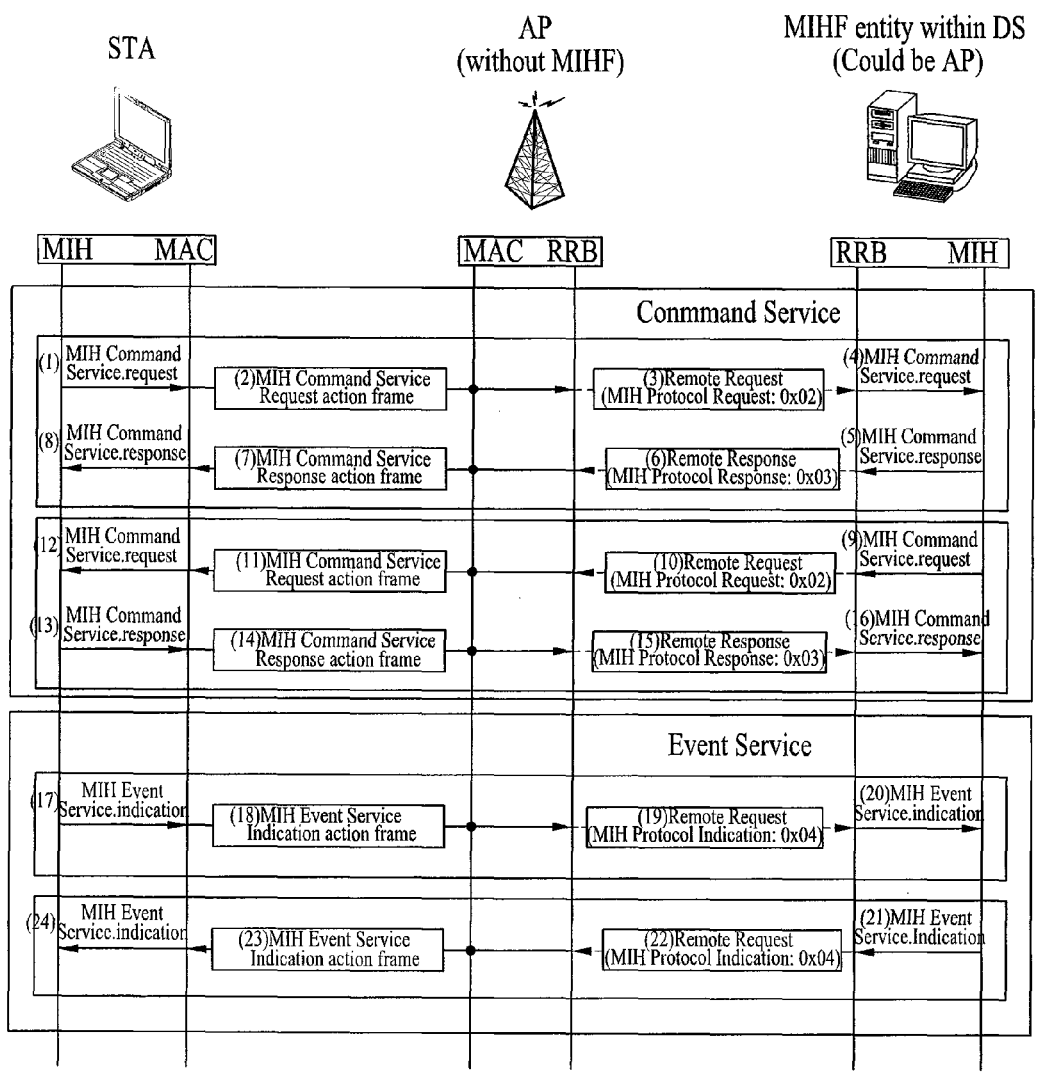

FIG. 24 is a flow chart illustrating another procedure according to the preferred embodiment of the present invention. Referring to FIG. 24, the wireless LAN network remotely transmits command service message and event service message of the MIH layer.

To remotely transmit the command service, the MIH layer of the wireless LAN mobile terminal transmits MIH primitive corresponding to the command service to the MAC layer of the wireless LAN (1). The MAC layer of the wireless LAN transmits the MIH command service request action frame including MIH command service request IE to transmit contents of the received primitive to the remote MIH layer. At this time, an address of the remote MIHF entity discovered through the MIH capability discovery procedure is encapsulated in the destination address of the action frame (2). The AP currently connected with the mobile terminal which has received the action frame forwards the MIH command service action frame to the RRB to relay the action frame, and the RRB forwards the remote request obtained by encapsulating the MIH command service action frame to the destination of the action frame which supports MIHF. At this time, a packet type of the remote request is set at 0x02 to indicate MIH protocol request (3). The RRB of the remote MIHF entity which has received the remote request transmits the MIH command service primitive corresponding to the encapsulated MIH command service request IE to the MIH layer (4). The MIHF entity within the DS forwards the response primitive of the corresponding MIH command service to the RRB to remotely transmit a response to the received MIH command service (5). The RRB which has received the response primitive makes a remote response message, encapsulates the MIH command service response action frame, which includes MIH command service response IE, in the remote response message, and transmits the MIH command service response action frame to the AP which is connected with the mobile terminal. At this time, a packet type of the remote response is set at 0x03 to indicate MIH protocol response. The MIH command service response action frame including MIH command service response IE may be generated by the RRB or the MAC layer to be forwarded to the RRB (6). The AP which is connected with the mobile terminal decapsulates the received remote response to acquire the MIH command service response action frame, and forwards the MIH command service response action frame to the mobile terminal through a radio field (7). The mobile terminal which has received the MIH command service response action frame transmits the MIH command service response primitive corresponding to MIH command service response IE included in the action frame to the MIH layer (8). Procedures (9) to (16) correspond to the case where the MIH entity within the DS first transmits MIH command to the mobile terminal and are similar to, (1) to (8).

The MIH layer of the wireless LAN mobile terminal remotely transmits the MIH primitive corresponding to event service desired for transmission to the MAC layer of the wireless LAN (17). The MAC layer of the wireless LAN transmits the MIH event service indication action frame including MIH event service indication IE to transmit contents of the received MIH primitive to the remote MIH layer. At this time, an address of the remote MIHF entity discovered through the MIH capability discovery procedure is encapsulated in the destination address of the action frame (18).

The AP currently connected with the mobile terminal which has received the action frame forwards the MIH event service indication action frame to the RRB to relay the action frame, and the RRB forwards the remote request obtained by encapsulating the received MIH command service action frame to the destination of the action frame which supports MIHF. At this time, a packet type of the remote request is set at 0x04 to indicate MIH protocol indication (19). The RRB of the remote MIHF entity which has received the remote request transmits the MIH event service primitive corresponding to the encapsulated MIH event service indication IE to the MIH layer (20). Procedures (21) to (24) correspond to the case where the MIH entity within the DS transmits MIH event service to the mobile terminal and are similar to (17) to (20).

Figure 25:
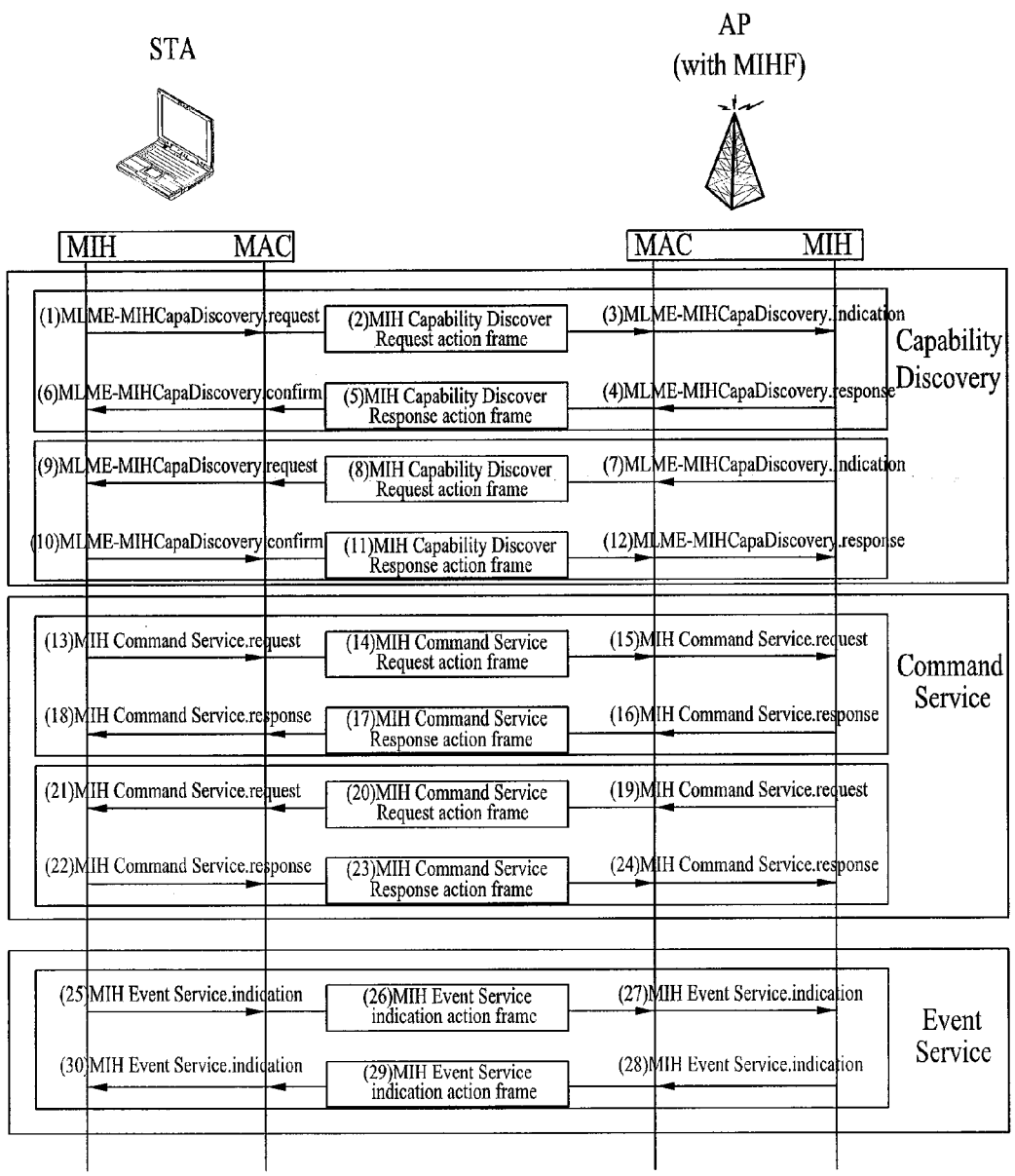

FIG. 25 is a flow chart illustrating another procedure according to the preferred embodiment of the present invention. Referring to FIG. 25, in the case that the AP which is currently connected with the mobile terminal of the wireless LAN supports MIHF, MIH capability discovery message, MIH command service message, and MIH event service message are transmitted and received between the mobile terminal and the AP. In the embodiment of FIG. 25, the procedures from the mobile terminal to the MAC layer of the AP are the same as those of the case where the entity which supports MIHF separately exists within the DS equivalent to the AP which is currently connected with the mobile terminal. However, the procedures of FIG. 25 are different from those of the case where the entity which supports MIHF separately exists within the DS equivalent to the AP which is currently connected with the mobile terminal in that the current AP transmits MIH primitive corresponding to IE included in the received action frame to its MIH layer without relaying the action frame received from the mobile terminal to the entity which supports MIHF existing within the DS as the current AP supports MIHF, and that the MIH layer of the AP transmits the corresponding MIH primitive to the MAC layer of the AP to generate the action frame corresponding to the primitive and remotely transmit the action frame to the mobile terminal when the AP desires to remotely transmit the MIH message to the mobile terminal.

Figure 26:
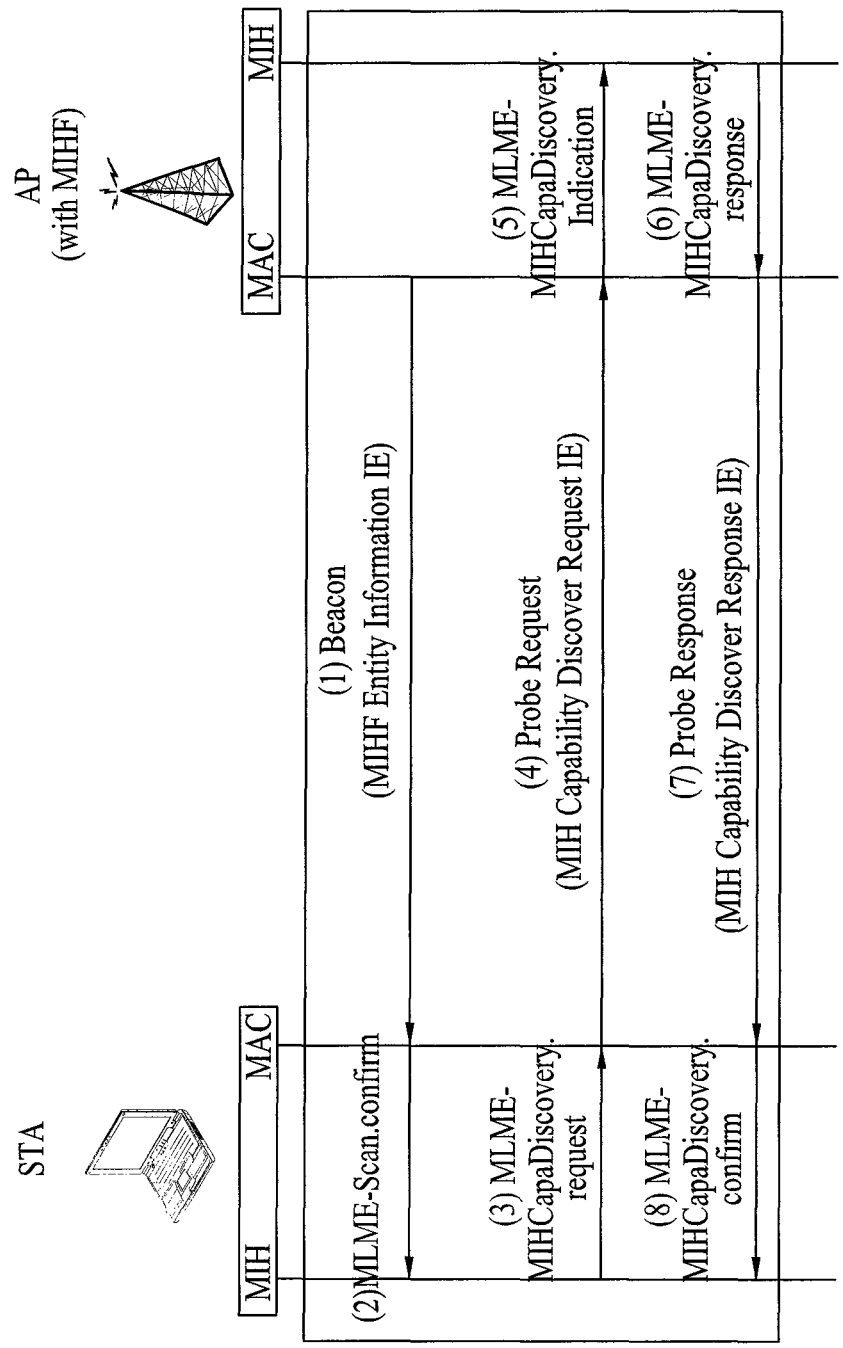

FIG. 26 is a flow chart illustrating another procedure according to the preferred embodiment of the present invention. Referring to FIG. 26, in the case that the AP which is to be currently connected with the mobile terminal of the wireless LAN supports MIHF, MIHF capability information (event and command list which is supported) of the current AP is acquired through the probe request/response message.

The MIHF entity information IE of the beacon is transmitted from the AP to one or more mobile terminals along with MIHF related information. Once the mobile terminal receives the above information, the mobile terminal identifies as to whether the current AP supports MIHF (1). The MAC layer of the mobile terminal which has received the beacon forwards MLME-Scan.confirm to the MIHF entity of the mobile terminal along with the MIHF entity information IE received through the beacon (2). The MIH layer of the mobile terminal transmits the MLME-MIHCapaDiscovery.request primitive to the MAC layer of the mobile terminal and starts MIH capability discovery procedure to discover event or command information which is supported by the current AP. The MLME-MIHCapaDiscovery.request may include the MIH capability discovery request IE containing event and command list information which is currently supported by the mobile terminal (3). The MAC layer of the mobile terminal transmits the probe request message to the AP along with the MIH capability discovery request IE received from the MLME-MIHCapaDiscovery.request primitive (4). The MAC layer of the AP transmits the MLME-MIHCapaDiscovery.indication primitive to the MIHF entity along with information of the MIH capability discovery request IE (5). The MIHF entity of the AP transmits the MLME-MIHCapaDiscovery.response primitive to the MAC layer along with MIH capability discovery response IE, wherein the MIH capability discovery response IE contains the event and command list is supported by the AP (6). The MAC layer of the AP transmits the probe response message to the MAC layer, wherein the probe response message includes MIH capability discovery response IE (7). The MAC layer of the mobile terminal transmits the MLME-MIHCapaDiscovery.confirm primitive to the MIHF entity to transmit information contained in the MIH capability discovery response IE (8).

Figure 27:
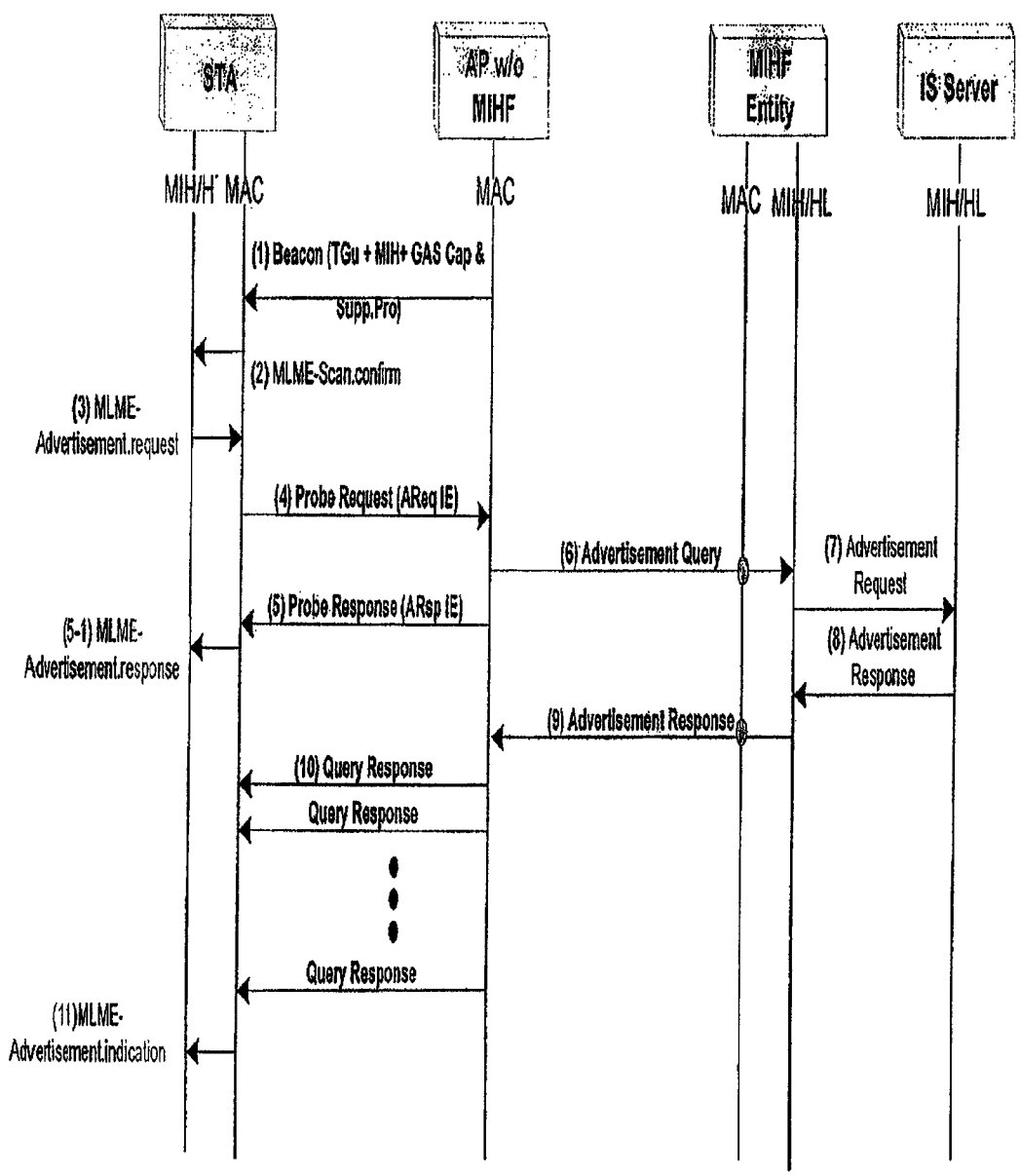

FIG. 27 is a flow chart illustrating another procedure according to another embodiment of the present invention. In FIG. 27, the mobile terminal acquires information related to a network entity in a homogeneous network or a heterogeneous network or information related to a link network linked to a network which includes an access point (AP) through the AP by using a probe request/response message. The link network could be a homogeneous network or a heterogeneous network with the network which includes the AP. The procedure of acquiring the information according to the embodiment of FIG. 27 can be used to acquire information related to capability which can be supported by the AP during network selection or network access of the mobile terminal.

Referring to FIG. 27, the AP transmits a beacon to the mobile terminal (1). The beacon means a frame which includes signaling information or control information for communication between the mobile terminal and the access point, and may include information related to MIHF capability and/or information about whether GAS (generic advertisement service or an entity having MIH interface (MIHF-AP) exists. An MAC layer of the mobile terminal delivers the information received from the AP to an upper layer including MIHF through the MLME-Scan.confirm primitive (2).

An upper management entity of the mobile terminal, i.e., system management entity (SME) or MIH entity forwards an MLME-Advertisement.request primitive to the MAC layer to acquire information related to the network entity or the link network (3). The MLME-Advertisement.request primitive includes identification information for identifying a type or format of requested information and information frame in accordance with the identification information. The information frame could be an MIH frame or a vendor specific frame. Preferably, the MIH frame is either an MIH IS (Information Service) frame or an MIH capability discovery frame for capability discovery of an event service and/or a command service.

The mobile terminal transmits a probe request message to the AP to request the information related to the network entity or the link network (4). The probe request message may include a part or all of contents of the MLME-Advertisement.request primitive. An AReq IE (Advertisement request) which is an information element included in the probe request message includes information (MIH_Capability_Discovery.request) such as support services (ES, CS and IS) of the MIHF entity or an MIH IS frame.

The AP transmits forwarding availability of the information requested through the probe request message and address information for broadcast or multicast to the mobile terminal through the probe response message (5). In other words, the probe response message may include a part or all of a status code, a query ID, a multicast address and MIH capability information, wherein the status code means code information as to whether the AP can provide information requested by the probe request message.

The AP may selectively include the MAC address the entity which supports MIHF and/or information about MIHF capability (MIHF_Capability_Discovery.response) of the AP probe response message if the AP supports MIHF.

The MAC layer of the mobile terminal forwards contents of the probe response message received from the access point to the upper management entity through an MLME-Advertisement.response primitive (6).

The AP forwards an advertisement query message including an MIH IS frame to an IS server through the MIHF entity to query information requested by the mobile terminal (6) and (7). This procedure may be performed together with the procedure (5) or may be performed prior to the procedure (5). If the MIHF entity performs a function of the IS server, the procedures (7) and (8) do not occur.

The information acquired from the IS server is forwarded to the AP through the MIHF entity (8) and (9). The AP transmits an action frame including the information acquired from the IS server to the mobile terminal through a query response message (10). The query response message including the action frame may be transmitted to the mobile terminal by a unicast method. Alternatively, the query response message may be transmitted by a broadcast or a multicast method. In other words, the AP may transmit the query response message to mobile terminals, which require information, by a broadcast or multicast method if the information is requested or even if the information is not requested. For example, the mobile terminals which have requested information during a certain time period are divided into one group so that the requested information is transmitted to the mobile terminal group by the multicast method. The AP can transmit the query response message repeatedly as much as previously set number of times to improve reliability in forwarding information.

The MAC layer of the mobile terminal forwards an MLME-Advertisement.indication primitive to the upper management entity to forward the information received from the AP (11).

In FIG. 27, if the mobile terminal requests support capability information of the MIH layer, the MAC layer of the mobile terminal can transmit the probe request message along with the MIH_Capability_Discovery.request primitive (4). In case that the AP supports MIHF and the MIH_Capability_Discovery.response frame is forwarded to the MIHF entity of the network along with the probe response message, the MIH_ Capability_Discovery.response frame is included in the query response message.

Figure 28:
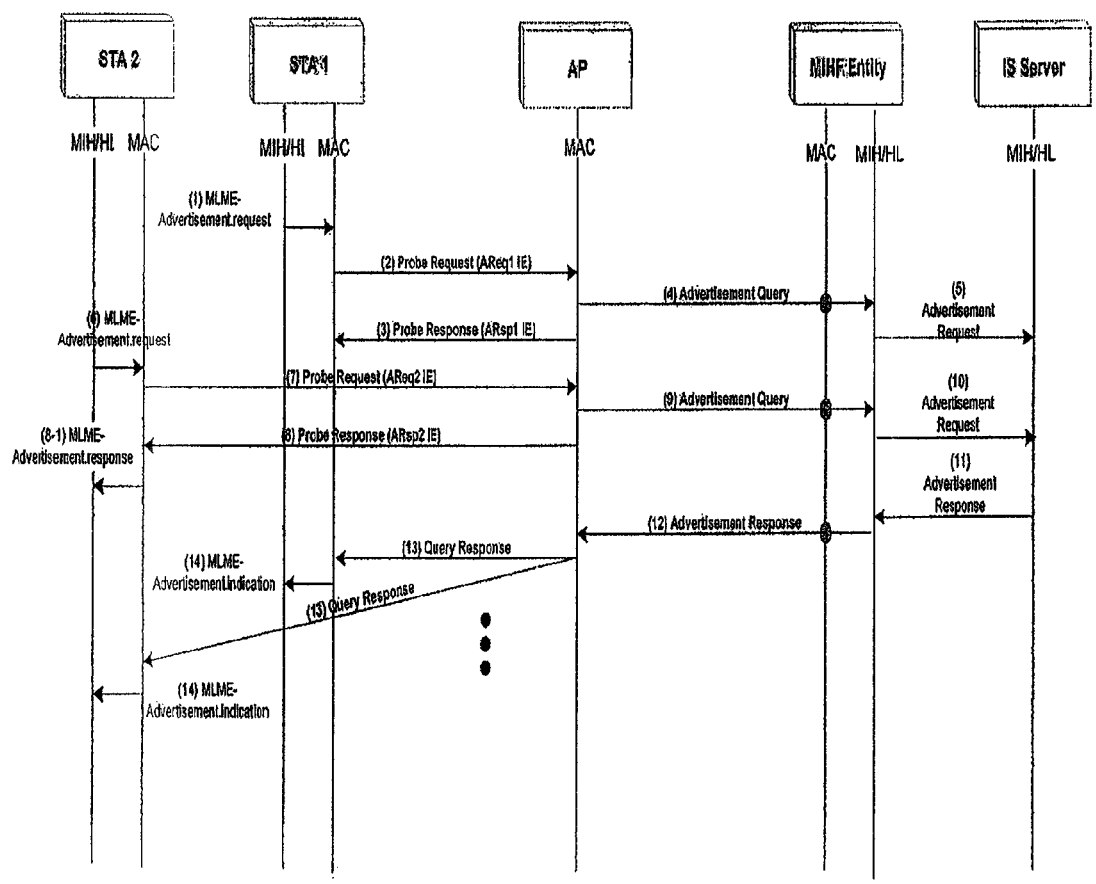

FIG. 28 is a flow chart illustrating another procedure according to the preferred embodiment of the present invention. Referring to FIG. 28, in the case that the AP which is to be currently connected with the mobile terminal of the wireless LAN does not support MIHF and receives information request AReq1 from the first mobile terminal and information request Areq2 from the second mobile terminal before acquiring corresponding information from the network, the AP fails to immediately provide the information. In this case, the AP together acquires the information requested from the first mobile terminal and the information requested from the second mobile terminal from the network and forwards the acquired information through group broadcast. The corresponding group is divided into group broadcast address, and the mobile terminals which have requested link information for a specific time period are divided into one group. In this embodiment, the second information request is received before information acquisition procedure after the first information request is received. Also, this embodiment includes the case where other information is requested.

The MIHF or HL (upper management entity) of the first mobile terminal (STA 1) transmits the MIH IS frame to the MAC layer through the MLME-Advertisement.request. The MIH IS frame includes information elements which the first mobile terminal desires to know (1). The MAC layer of the mobile terminal can include the MIH IS frame in AReq1 IE and request MIH capability information (as to whether to provide event, command, and information services) of a corresponding entity if it knows the presence of the MIHF entity other than the current AP (2). The AP reports to the mobile terminal forwarding availability of requested information and that query response will be broadcast using a group broadcast address if the AP supports GAS later. Also, the MAC layer of the mobile terminal may selectively include MAC address of the entity which supports MIHF in AReq1 (3). The AP starts query for acquiring information requested from the mobile terminal to the MIHF entity or the IS server. This may be generated before the procedure (3) or together with the procedure (3) (4) and (5). The procedures (6) to (10) are those started by the second mobile terminal (STA 2) and are the same as the procedures (1) to (5). At this time, although the information requested from HL (upper management entity) of the second mobile terminal may include the information requested from the first mobile terminal or may be information different from the information requested from the first mobile terminal, the AP allocates the same group broadcast address to the first and second mobile terminals which have requested the information within a certain time (6)~(10). The MIHF entity acquires the information requested from the first mobile terminal and the information requested from the second mobile terminal from the information server and forwards the acquired information to the AP (11) and (12). The AP broadcasts the action frame including the acquired information in group so that the information requested from the first mobile terminal and the information requested from the second mobile terminal are transmitted to each MAC layer at one time. Also, the action frame can be transmitted several times as much as the number of repeated times to improve reliability or can selectively undergo fragmentation (13). Each MAC layer of the first and second mobile terminals forwards the information received through the MLME-Advertisement.indication to HL (14).

According to the present invention, the mobile terminal can transmit and receive the remote MIH message for media independent handover in the wireless LAN while ensuring QoS better than that of a general data frame. In the case that the current AP which is connected with the mobile terminal supports MIHF or another entity within the DS equivalent to the current AP, for example, server, supports MIHF, the mobile terminal can transmit and receive the MIH message to and from the MIHF entity through the current AP. In the case that a separate MIHF entity exists within the DS equivalent to the current AP, the separate MIHF entity broadcasts MIH capability response so as to prevent unnecessary message from being transmitted from the mobile terminal by on-demand, thereby reducing waste of the radio resource and battery consumption of the mobile terminal.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Industrial Applicability

Technical features of the present invention can be applied to either a wireless communication system, such as wireless LAN, mobile communication system, and wireless Internet system, or a multimode network with which two or more networks are combined.

What is claimed is:

1. A method of discovering availability of information related to an external network in a wireless local area network, the method comprising:

transmitting, by a requesting station, a request message to a responding station via a wireless channel, the request message including an advertisement identifier and requesting that the responding station retrieve information related to a media independent handover (MIH) information service (IS) from a server of the external network;

receiving, by the requesting station, a query response message as a response to the request message from the responding station via the wireless channel, the query response message including the advertisement identifier and a fragmentation field, the fragmentation field indicating that a query response which the responding station receives from the server is fragmented; and receiving, by the requesting station, at least one fragmentation response message from the responding station via the wireless channel, the at least one fragmentation response message including the advertisement identifier, a more fragmentation field, a sequence number field, and a fragment of the query response, wherein the advertisement identifier identifies the server of the external network, wherein the more fragmentation field has one bit and indicates whether the fragment of the query response in a corresponding fragmentation response message is a last fragment, wherein the sequence number field has more than 3 bits and indicates a fragment number of a corresponding fragmentation response message, and wherein the method further comprises determining, by the requesting station, that any fragment of the query response is missing based on the sequence number field.

2. The method as claimed in claim 1, further comprising receiving, by the requesting station, a beacon frame from the responding station, the beacon frame indicating whether the retrieval of the information related to the MIH IS is supported.

3. An apparatus for discovering availability of information related to an external network in a wireless local area network, the apparatus comprising:

a memory device; and a protocol stack configured to:

transmit a request message to a responding station via a wireless channel, the request message including an advertisement identifier and requesting that the responding station retrieve information related to a media independent handover (MIH) information service (IS) from a server of the external network;

receive a query response message as a response to the request message from the responding station via the wireless channel, the query response message including the advertisement identifier and a fragmentation field, the fragmentation field indicating that a query response which the responding station receives from the server is fragmented; and receive at least one fragmentation response message from the responding station via the wireless channel, the at least one fragmentation response message including the advertisement identifier, a more fragmentation field, a sequence number field, and a fragment of the query response, wherein the advertisement identifier identifies the server of the external network, wherein the more fragmentation field has one bit and indicates whether the fragment of the query response in a corresponding fragmentation response message is a last fragment, wherein the sequence number field has more than 3 bits and indicates a fragment number of a corresponding fragmentation response message, and wherein the protocol stack is further configured to determine that any fragment of the query response is missing based on the sequence number field.

4. The apparatus as claimed in claim 3, wherein the protocol stack is further configured to receive a beacon frame from the responding station, the beacon frame indicating whether the retrieval of the information related to the MIH IS is supported.

* * * * *